United States Patent
Long et al.

(10) Patent No.: US 11,971,725 B2
(45) Date of Patent: Apr. 30, 2024

(54) SYSTEM AND METHOD FOR PERFORMING SPRAYING OPERATIONS WITH AN AGRICULTURAL APPLICATOR

(71) Applicant: CNH Industrial America LLC, New Holland, PA (US)

(72) Inventors: Scott Allen Long, Plainfield, IL (US); Trevor Stanhope, Oak Lawn, IL (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 56 days.

(21) Appl. No.: 17/501,509

(22) Filed: Oct. 14, 2021

(65) Prior Publication Data

US 2023/0119310 A1    Apr. 20, 2023

(51) Int. Cl.
| | |
|---|---|
| G05D 1/02 | (2020.01) |
| A01C 23/00 | (2006.01) |
| A01M 7/00 | (2006.01) |
| B05B 12/12 | (2006.01) |
| B64C 39/02 | (2023.01) |

(Continued)

(52) U.S. Cl.
CPC ......... *G05D 1/0246* (2013.01); *A01C 23/007* (2013.01); *A01M 7/0089* (2013.01); *B05B 12/12* (2013.01); *B64C 39/024* (2013.01); *B64D 47/08* (2013.01); *G05D 1/0027* (2013.01);

(Continued)

(58) Field of Classification Search
CPC .. G05D 1/0246; G05D 1/0027; G05D 1/0219; G05D 1/0297; G05D 2201/0201; G05D 1/0094; A01C 23/007; A01M 7/0089; A01M 7/0057; B05B 12/12; B05B 12/122; B05B 1/205; B64C 39/024;

(Continued)

(56) References Cited

U.S. PATENT DOCUMENTS

| | | |
|---|---|---|
| 9,382,003 B2 | 7/2016 | Burema et al. |
| 9,745,060 B2 | 8/2017 | O'Connor et al. |

(Continued)

FOREIGN PATENT DOCUMENTS

CN        105022401        8/2017

OTHER PUBLICATIONS

Pasquale Daponte et al, "A review on the use of drones for precision agriculture," 2019 IOP Conf. Ser .: Earth Environ. Sci. 275 012022 (11 pages) https://iopscience op.org/article/10.1088/1755-1315/275/1/012022/pdf.

(Continued)

*Primary Examiner* — Rachid Bendidi
(74) *Attorney, Agent, or Firm* — Rebecca L. Henkel; Rickard K. DeMille; Peter K. Zacharias

(57) ABSTRACT

A system for an agricultural operation includes a first vehicle equipped with an imaging sensor configured to capture image data associated within a field. A computing system is communicatively coupled with the imaging sensor. The computing system is configured to receive the image data associated with the field, identify one or more objects within the image data as a target, identify one or more objects within the image data as a landmark, determine a location of the target relative to the landmark, and generate a control command for a second vehicle. The control command includes the location of the target relative to the landmark within the field.

15 Claims, 10 Drawing Sheets

(51) Int. Cl.
  *B64D 47/08*  (2006.01)
  *G05D 1/00*  (2006.01)
  *B64U 10/13*  (2023.01)
  *B64U 101/30*  (2023.01)
(52) U.S. Cl.
  CPC ........... *G05D 1/0219* (2013.01); *B64U 10/13* (2023.01); *B64U 2101/30* (2023.01)
(58) Field of Classification Search
  CPC .... B64D 47/08; B64U 10/13; B64U 2101/30; B64U 2101/20; B64U 2101/40
  See application file for complete search history.

(56) References Cited

U.S. PATENT DOCUMENTS

| | | | |
|---|---|---|---|
| 9,969,492 | B2 | 5/2018 | Detweiler et al. |
| 10,165,722 | B2 | 1/2019 | Ackerman et al. |
| 10,255,670 | B1 | 4/2019 | Wu et al. |
| 10,772,253 | B2 | 9/2020 | Calleija et al. |
| 10,901,420 | B2 | 1/2021 | Achtelik et al. |
| 11,280,608 | B1 * | 3/2022 | Zermas ................... G01S 19/45 |
| 11,477,935 | B1 * | 10/2022 | Muehlfeld .......... A01M 7/0089 |
| 2017/0015416 | A1 * | 1/2017 | O'Connor ........... A01M 7/0089 |
| 2017/0031365 | A1 * | 2/2017 | Sugumaran .......... A01B 79/005 |
| 2017/0083024 | A1 * | 3/2017 | Reijersen Van Buuren ................ G01C 21/3623 |
| 2017/0127606 | A1 * | 5/2017 | Horton ................... G06T 17/05 |
| 2017/0245419 | A1 * | 8/2017 | Barbosa ................. B64C 39/024 |
| 2018/0092295 | A1 * | 4/2018 | Sugumaran ............ A01C 21/00 |
| 2018/0338422 | A1 * | 11/2018 | Brubaker ................. G06F 9/46 |
| 2019/0047009 | A1 * | 2/2019 | Barker .................... B05B 12/16 |
| 2019/0116726 | A1 * | 4/2019 | Paralikar .................. G06T 7/50 |
| 2019/0162551 | A1 * | 5/2019 | Kean ...................... G06V 20/20 |
| 2020/0113166 | A1 | 4/2020 | Warren, Jr. et al. |
| 2021/0078706 | A1 * | 3/2021 | Lin ........................ G06V 20/17 |
| 2021/0315159 | A1 * | 10/2021 | Kyochika ............ A01D 41/127 |
| 2021/0357664 | A1 * | 11/2021 | Kocer .................. B64C 39/024 |
| 2021/0406538 | A1 * | 12/2021 | Lo .......................... G06T 17/20 |
| 2023/0004167 | A1 * | 1/2023 | Sawlaw ............... G05D 1/0223 |

OTHER PUBLICATIONS

Dimosthenis C. Tsouros et al, "A Review on UAV-Based Applications for Precision Agriculture," Information 2019, 10, 349; doi: 10.3390/info 10110349, Department of Electrical and Computer Engineering, University of Western Macedonia dated Oct. 7, 2019 (26 pages) https://www.mdpi.com/2078-2489/10/11/349/pdf.

Ciro Potena et al, "AgriColMap: Aerial-Ground Collaborative 3D Mapping for Precision Farming," In: IEEE Robotics and Automation Letters, vol. 4, Issue: 2, 2019 https://arxiv.org/pdf/1810.00457.pdf.

* cited by examiner

SYSTEM AND METHOD FOR PERFORMING SPRAYING OPERATIONS WITH AN AGRICULTURAL APPLICATOR

FIELD

The present disclosure generally relates to agricultural applicators for performing spraying operations within a field and, more particularly, to systems and methods for performing spraying operations with an agricultural sprayer, such as spraying operations that allow for selective application of an agricultural product onto an underlying field.

BACKGROUND

Agricultural sprayers apply an agricultural product (e.g., a pesticide, a nutrient, and/or the like) onto crops and/or a ground surface as the sprayer is traveling across a field. To facilitate such travel, sprayers can be configured as self-propelled vehicles or implements towed behind an agricultural tractor or another suitable work vehicle. In some instances, the sprayer includes an outwardly extending boom assembly having a plurality of boom sections supporting a plurality of spaced-apart nozzle assemblies. Each nozzle assembly has a valve configured to control the spraying of the agricultural product through a nozzle onto underlying targets, which may include crops and/or weeds.

Some sprayers may control the flow of agricultural product through individual nozzles based on data received from sensors mounted on the boom sections that detect one or more field conditions (e.g., crops, weeds, moisture content, etc.). However, such processes may limit a speed that the sprayer may travel and/or unnecessarily travel in various portions of the field.

Accordingly, an improved system and method for performing spraying operations would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural operation includes a first vehicle equipped with an imaging sensor configured to capture image data associated within a field. A computing system is communicatively coupled with the imaging sensor. The computing system is configured to receive the image data associated with the field, identify one or more objects within the image data as a target, identify one or more objects within the image data as a landmark, determine a location of the target relative to the landmark, and generate a control command for a second vehicle. The control command includes the location of the target relative to the landmark within the field.

In some aspects, the present subject matter is directed to a method for selectively applying an agricultural product. The method includes capturing one or more images of an underlying field with one or more imaging sensors associated with a first vehicle. The method also includes developing a map of at least a portion of the underlying field based on the one or more images. The method further includes identifying one or more targets within the one or more images. Lastly, the method includes determining a location of the one or more targets within the map.

In some aspects, the present subject matter is directed to a system for an agricultural operation that includes a first vehicle equipped with an imaging sensor configured to capture image data associated within a field. A second vehicle includes a boom assembly having one or more nozzle assemblies configured to exhaust an agricultural product. A computing system is communicatively coupled with the imaging sensor and the second vehicle. The computing system is configured to determine a location of an object within the image data provided by the imaging sensor relative to a landmark identified within the image data provided by the imaging sensor and generate a control command for the second vehicle.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
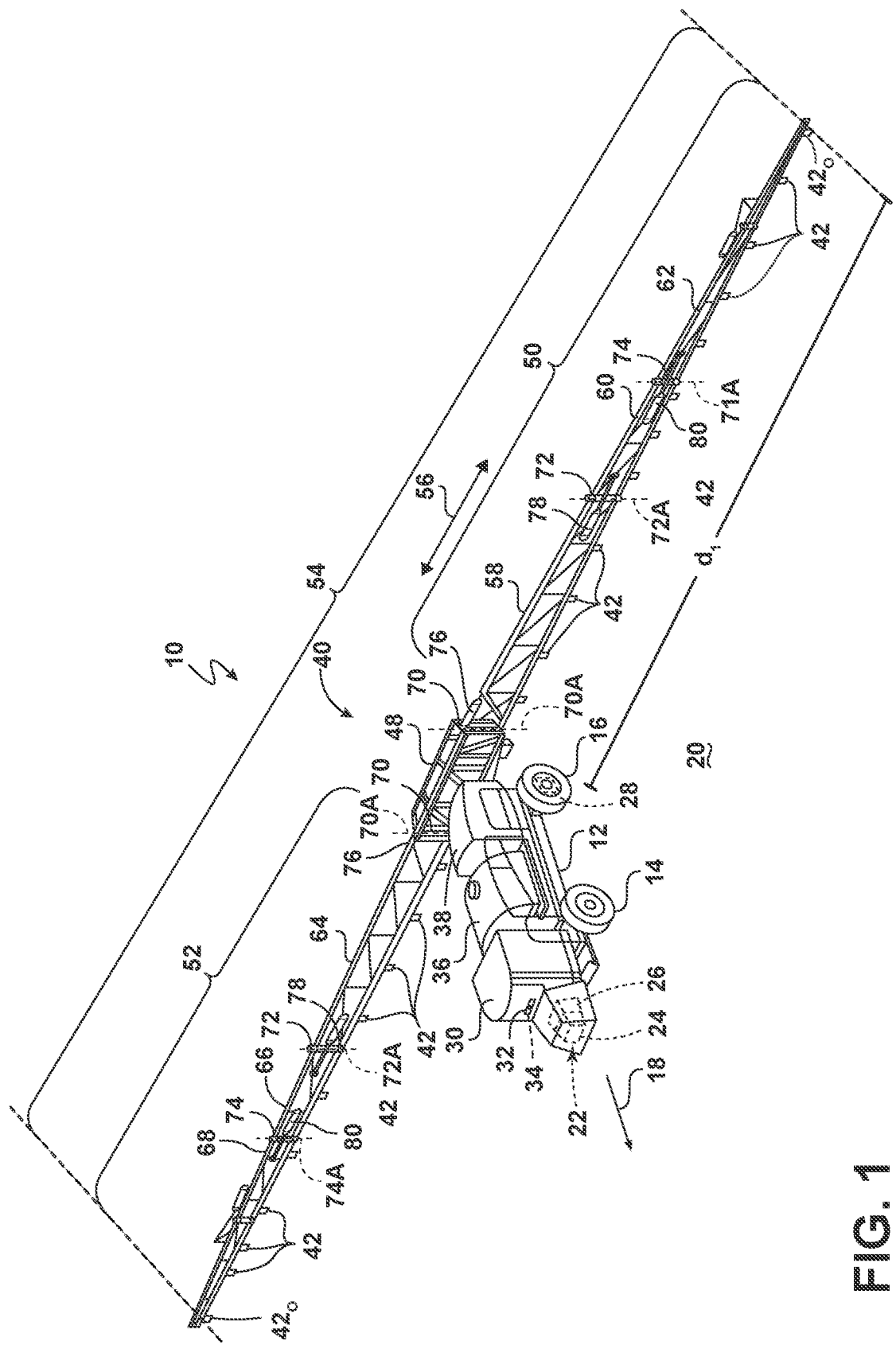
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for an agricultural operation that includes a first work vehicle that may be used to detect one or more targets within the field during a first operation and a second vehicle that may apply an agricultural product to each target during a second operation.

In some instances, the system includes a first vehicle equipped with an imaging sensor configured to capture image data associated with a field. In various examples, the first vehicle is configured as an unmanned aerial vehicle (UAV). While the first vehicle described below are generally illustrated and described as a UAV, it will be appreciated that the first vehicle may additionally or alternatively be configured as a tractor, a harvester, a self-propelled windrower, a self-propelled sprayer, and/or the like. As such, in various examples, the first vehicle may be configured to perform at least one of a planting process, seeding process, a tilling process, a mapping process, a scouting process, a harvesting process, and/or any other process during the operation of the first vehicle. In addition, it will be appreciated that the first vehicle may be human-controlled, autonomously controlled, and/or semi-autonomously controlled without departing from the teachings provided herein.

The system may also include a second vehicle. In some examples, the second vehicle includes a boom assembly having one or more nozzle assemblies positioned along the boom assembly. As such, the second vehicle may be configured to apply an agricultural product to an object, which may be located within a field.

In various embodiments, based on the data collected during a first operation performed by the first vehicle, the system may be configured to identify one or more objects within the image data as a target. In addition, the system may be configured to identify at least one landmark within the image data. Once a target and a landmark are identified within image data from the first vehicle, the system may be configured to determine a location of the target relative to the landmark to geolocate the weed. In turn, the system may be configured to generate a control command for a second vehicle with the control command including the location of the target relative to the landmark within the field. In addition to receiving the control command, the second vehicle may also receive mapping data based on the image data from the first vehicle. Based on a correlation of the image data from the first vehicle with image data captured by one or more target sensors of the second vehicle, a common location of a landmark may be identified. Based on a common landmark being identified, a position of the target relative to the second vehicle may be determined. Once the target is within an application region of a nozzle assembly, the nozzle assembly may be actuated to exhaust an agricultural product onto the target. In some instances, the mapping data may also include topology data of the field. In such instances, a predicted deflection model may be generated which may assist in locating of the weed based on the image data from the imaging sensor and the image data from the target sensor as the boom may be deflected from a default position.

Figure 2:
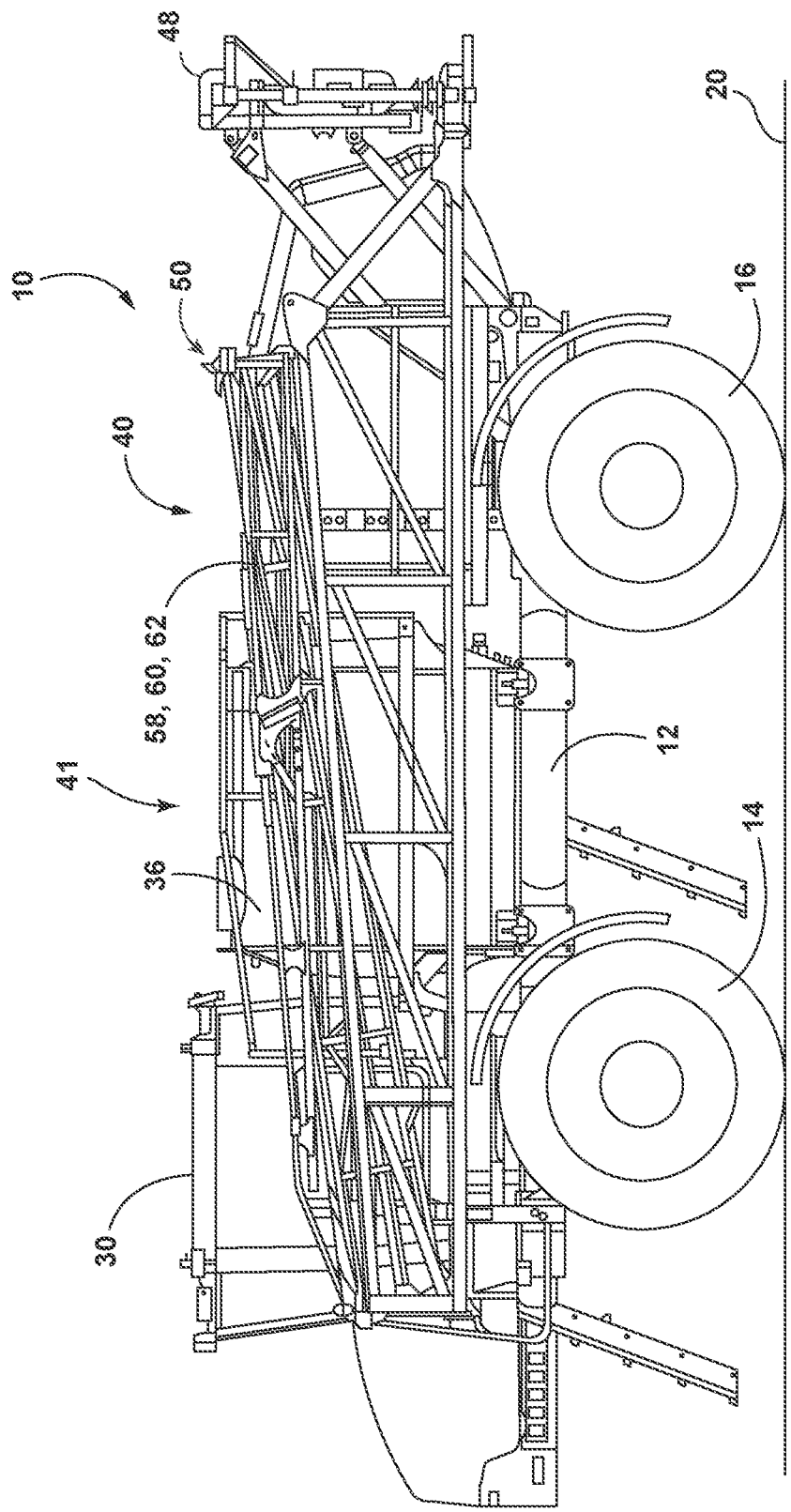
FIG. 2 illustrates a side view of the agricultural sprayer in accordance with aspects of the present subject matter.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality of components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a powertrain control system 22, that includes a power plant 24, such as an engine, a motor, or a hybrid engine-motor combination, a transmission system 26 configured to transmit power from the engine to the wheels 14, 16, and/or a brake system 28.

The chassis 12 may also support a cab 30, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface 32, such as a human-machine interface (HMI), for providing messages and/or alerts to the operator and/or for allowing the operator to interface with the vehicle's controller through one or more user-input devices 34 (e.g., levers, pedals, control panels, buttons, and/or the like) within the cab 30 and/or in any other practicable location.

Figure 3:
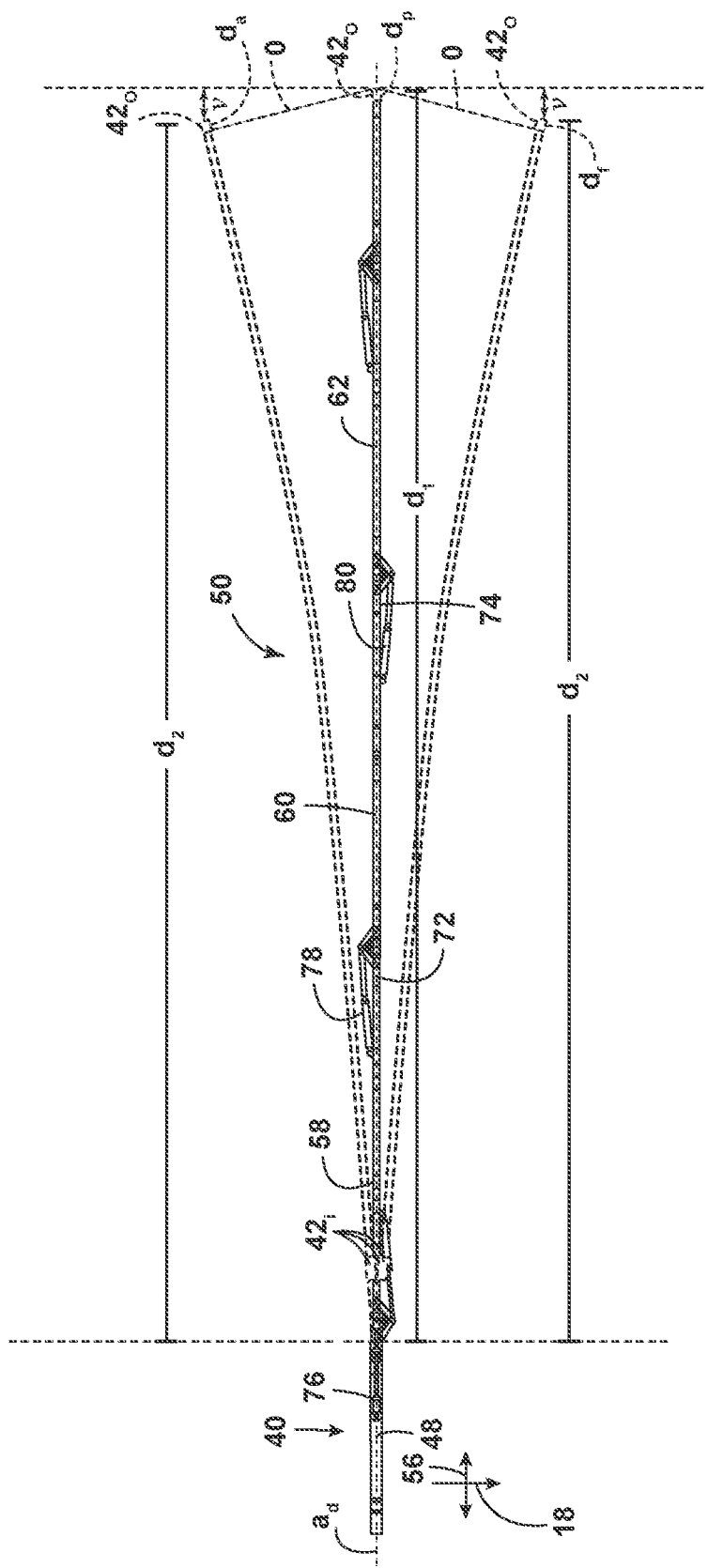
FIG. 3 illustrates a simplified, schematic view of a boom arm of a boom assembly in accordance with aspects of the present subject matter, particularly illustrating the boom arm being deflected in a fore and an aft direction.

The chassis 12 may also support a product system 41. The product system 41 can include one or more tanks, such as a product tank 36 and/or a rinse tank 38. The product tank 36 is generally configured to store or hold an agricultural product, such as pesticides (e.g., herbicides, insecticides, rodenticides, etc.) and/or nutrients. The agricultural product is conveyed from the product tank 36 and/or the rinse tank 38 through a product circuit including numerous plumbing components, such as interconnected pieces of tubing, for release onto the underlying field 20 (e.g., plants and/or soil) through one or more nozzle assemblies 42 mounted on the boom assembly (or the sprayer 10). Each nozzle assembly 42 may include, for example, a spray nozzle 44 (FIG. 3) and an associated valve 46 (FIG. 3) for regulating the flow rate of the agricultural product through the nozzle 44 (and, thus, the application rate of the nozzle assembly 42), thereby allowing the desired spray characteristics of the output or spray fan of the agricultural product expelled from the nozzle 44 to be achieved. In some instances, each valve 46 may be selectively activated to direct an agricultural product towards a defined target 94 (FIG. 3). For instance, each valve 46 may be selectively activated to deposit a suitable herbicide towards a detected/identified weed 96 (FIG. 3) and/or a nutrient towards a detected/identified crop 98 (FIG. 3).

The chassis 12 may further support a boom assembly 40 that can include a frame 48 that supports first and second boom arms 50, 52, which may be orientated in a cantilevered nature. The first and second boom arms 50, 52 are generally movable between an operative or unfolded position (FIG. 1) and an inoperative or folded position (FIG. 2). When distributing the agricultural product, the first boom arm and/or the second boom arm 50, 52 extends laterally outward from the agricultural sprayer 10 to the operative position in order to cover wide swaths of the underlying ground surface, as illustrated in FIG. 1. When extended, each boom arm 50, 52 defines an extension distance $E_d$ defined between the frame 48 and an outer end portion of the boom arms 52. Further, the boom arms 50, 52, when both unfolded, define a field swath 54 between respective outer nozzle assemblies $42_o$ of the first and second boom arms 50, 52 that is generally commensurate with an area of the field 20 to which the agricultural sprayer 10 covers during a pass across a field 20 to perform the agricultural operation. However, it will be appreciated that in some embodiments, a single boom arm 50, 52 may be utilized during the application operation. In such instances, the field swath 54 may be an area defined between a pair of nozzle assemblies 42 that are furthest from one another in a lateral direction 56.

To facilitate transport, each boom arm 50, 52 of the boom assembly 40 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 50, 52 of the boom assembly 40 may generally include one or more boom sections. For instance, in the illustrated embodiment, the first boom arm includes three boom sections, namely a first inner boom section 58, a first middle boom section 60, and a first outer boom section 62, and the second boom arm 52 includes three boom sections, namely a second inner boom section 64, a second middle boom section 66, and a second outer boom section 68. In such an embodiment, the first and second inner boom sections 58, 64 may be pivotably coupled to the frame 48. Similarly, the first and second middle boom sections 60, 66 may be pivotably coupled to the respective first and second inner boom sections 58, 64, while the first and second outer boom sections 62, 68 may be pivotably coupled to the respective first and second middle boom sections 60, 66. For example, each of the inner boom sections 58, 64 may be pivotably coupled to the frame 48 at pivot joints 70. Similarly, the middle boom sections 60, 66 may be pivotally coupled to the respective inner boom sections 58, 64 at pivot joints 72, while the outer boom sections 62, 68 may be pivotably coupled to the respective middle boom sections 60, 66 at pivot joints 74.

As is generally understood, pivot joints 70, 72, 74 may be configured to allow relative pivotal motion between the adjacent boom sections of each boom arm 52. For example, the pivot joints 70, 72, 74 may allow for articulation of the various boom sections between a fully extended or working position (e.g., as shown in FIG. 1), in which the boom sections are unfolded along the lateral direction 56 of the boom assembly 40 to allow for the performance of an agricultural spraying operation, and a transport position (FIG. 2), in which the boom sections are folded inwardly to reduce the overall width of the boom assembly 40 along the lateral direction 56. It will be that, although each boom arm 50, 52 is shown in FIG. 1 as including three individual boom sections coupled along opposed sides of the central boom section, each boom arm 50, 52 may generally have any suitable number of boom sections.

Additionally, as shown in FIG. 1, the boom assembly 40 may include inner fold actuators 76 coupled between the inner boom sections 58, 64 and the frame 48 to enable pivoting or folding between the fully-extended working position and the transport position. For example, by retracting/extending the inner fold actuators 76, the inner boom sections 58, 64 may be pivoted or folded relative to the frame 48 about a pivot axis 70A defined by the pivot joints 70. Moreover, the boom assembly 40 may also include middle fold actuators 78 coupled between each inner boom section 58, 64 and its adjacent middle boom section 60, 66 and outer fold actuators 80 coupled between each middle boom section 60, 66 and its adjacent outer boom section 62, 68. As such, by retracting/extending the middle and outer fold actuators 78, 80, each middle and outer boom section 60, 66, 62, 68 may be pivoted or folded relative to its respective inwardly adjacent boom section 58, 64, 60, 66 about a respective pivot axis 72A, 74A. When moving to the transport position, the boom assembly 40 and fold actuators 76, 78, 80 are typically oriented such that the pivot axes 70A, 72A, 74A are generally parallel to the vertical direction and, thus, the various boom sections 58, 64, 60, 66, 62, 68 of the boom assembly 40 are configured to be folded horizontally (e.g., parallel to the lateral direction 56) about the pivot axes 70A, 72A, 74A to keep the folding height of the boom assembly 40 as low as possible for transport. However, the pivot axes 70A, 72A, 74A may be oriented along any other suitable direction.

Referring to FIG. 3, prior to performing an agricultural operation with the boom assembly 40, either boom arm 50, 52 may be configured to extend a first lateral distance $d_1$ away from the sprayer 10 and/or the frame 48 along a default axis $a_d$. It will be appreciated that although boom arm 50 is generally illustrated in FIG. 3, any boom arm 50, 52 of the boom assembly 40 may operate in a similar manner without departing from the scope of the present disclosure.

In various embodiments, the default axis as may generally be perpendicular relative to the vehicle travel direction 18 such that the default axis as is generally aligned with the lateral direction 56. The first lateral distance $d_1$ can be defined as a distance between the frame 48 and an outer nozzle assembly $42_o$ and/or an outer end portion of each boom arm 50, 52. Moreover, when the first and second boom arms 50, 52 are extended from opposing sides of the frame 48, the boom arms 50, 52 can define a field swath 54 (a portion of the field swath is illustrated in FIG. 3) between the outer nozzle assemblies $42_o$ of the first and second boom arms 50, 52, or between the outer end portions of the first and second boom arms 50, 52 depending on the agricultural operation and/or a specific spray operation. Further, in some operations, a single boom arm 50, 52 may be used. In such instances, the field swath 54 may be defined between an outer and an inner operating nozzle assembly $42_i$, $42_o$.

During operation, various forces may be placed on the boom assembly 40 causing the boom arms 50, 52 and, consequently, the nozzle assemblies 42 positioned along the boom arms 50, 52, to be deflected or repositioned relative to the frame 48 and/or the sprayer 10. For instance, a portion of the boom assembly 40 may be deflected from an assumed or a default position $d_p$ due to high dynamic forces encountered when the sprayer 10 is turned, accelerated, or decelerated. In addition, terrain variations and weather variances may also cause deflection of the boom assembly 40. Further, a portion of the boom assembly 40 may come in contact with an object, thereby leading to deflection of the boom assembly 40.

Once the boom arm 50 is deflected in a fore direction df (i.e., a direction of forward movement of the sprayer 10 as indicated by arrow 18 in FIG. 1) and/or in an aft direction $d_a$ (i.e., an opposing direction of the forward movement of the sprayer 10 as indicated by arrow 18 in FIG. 1) of its default position $d_p$, as generally illustrated in dotted lines in FIG. 3, the outer nozzle assembly $42_o$ may be positioned a second lateral distance $d_2$ from the frame 48, which may be less than the first lateral distance $d_1$ due to a curvature of the boom assembly 40. Accordingly, a lateral variance v is formed between the first and second lateral distances $d_1$, $d_2$. This lateral variance v may lead to a misapplication of an agricultural product to the underlying field 20. In addition to creating a variance v, the deflection of the boom arm 50 also creates an offset between the outer nozzle assembly $42_o$ in the default position $d_p$ and the deflected positions df $d_a$, which may also lead to inaccuracies during the application of the agricultural product to the underlying field 20.

In embodiments that utilize a boom arm 50 that is supported by the frame 48 in a cantilevered orientation (or any other non-uniform orientation), such as the one illustrated in FIG. 3, an outer nozzle assembly $42_o$ will have a greater deflection magnitude from its default position $d_p$ than an inner nozzle assembly $42_i$. Once the deflective force is overcome and/or no longer present, the boom arm 50 will move back towards its default position $d_p$. In some embodiments, the movement of the boom arm may generally occur as harmonic oscillations across the default axis as such that the boom arm 50 may move from a position at least partially aft of the default axis $a_d$ to the default position $d_p$ and then to a position at least partially fore of the default position $d_p$ and so on. During the oscillations, an acceleration or speed of an inner nozzle assembly $42_i$ will be less than the outer nozzle assembly $42_o$ due to the varied deflection magnitudes along the boom arm 50.

In some embodiments, a boom speed or boom acceleration of each nozzle assembly 42 along the boom arm 50 may be calculated based on the detected and/or calculated position of various portions of the boom arm 50 at known periods to define a boom deflection model. The boom deflection model may map a deflection of each nozzle assembly 42 from a default axis $a_d$, a nozzle speed or acceleration, and/or a direction of movement of each nozzle assembly 42 relative to the frame 48. Thus, the model may be used to determine an upcoming activation time for one or more nozzle assemblies 42 to exhaust the agricultural product on a defined target 94. In various embodiments, the boom deflection model may be determined through various geometric equations, lookup tables (LUTs), and/or any other method to determine a position, a speed, and/or an acceleration of each nozzle. Furthermore, the boom deflection model may also provide a prediction of the movement of each nozzle at some future time based on the current deflection of the boom assembly, vehicle conditions, and/or any other input. Based on the boom deflection model, the timing of the deposition of the agricultural product may be altered to selectively spray the target 94, and/or a nozzle to be used for exhausting agricultural product towards the target 94 may be chosen. In some instances, by using a boom deflection model, processing requirements may be lessened when compared to calculating each speed at all times, thereby making the system more responsive.

Figure 4:
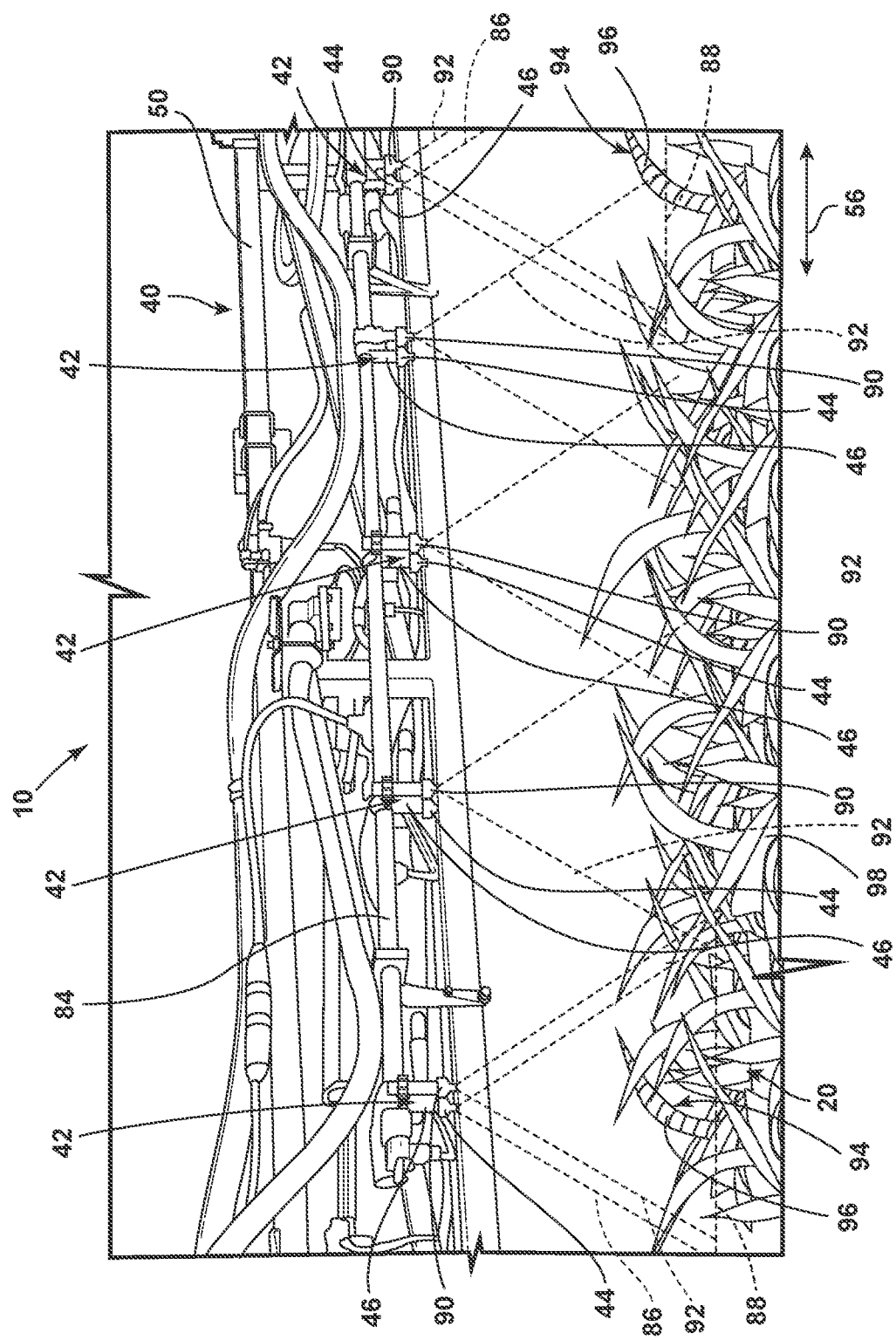
FIG. 4 is a front perspective view of the boom assembly including a plurality of nozzle assemblies positioned there along in accordance with aspects of the present subject matter.

Referring now to FIG. 4, a front perspective view of the boom assembly including a plurality of nozzle assemblies positioned there along is illustrated in accordance with aspects of the present subject matter. In some embodiments, the boom assembly 40 may be configured to support a plurality of nozzle assemblies 42. Each nozzle assembly 42 may, in turn, be configured to dispense the agricultural product stored within the product tank 36 (FIG. 1) and/or the rinse tank 38 (FIG. 1) onto a target 94. In several embodiments, the nozzle assemblies 42 may be mounted on and/or coupled to the first and/or second boom arms 50, 52 of the boom assembly 40, with the nozzle assemblies 42 being spaced apart from each other along the lateral direction 56. Furthermore, fluid conduits 84 may fluidly couple the nozzle assemblies 42 to the product tank 36 and/or the rinse tank 38. In this respect, as the sprayer 10 travels across the field 20 in the direction of forward travel 18 (FIG. 1) to perform a spraying operation, the agricultural product moves from the product tank 36 through the fluid conduits to each of the nozzle assemblies 42. The nozzles 44 may, in turn, dispense or otherwise spray a fan 86 of the agricultural product onto the target 94 when the target 94 is in an application region 88 that corresponds to an area for which the agricultural product exhausted from the nozzle 44 may contact. In various instances, the application region 88 may be varied based on various factors, which can include, but are not limited to, sprayer conditions (e.g., speed of the sprayer 10, direction of travel of the sprayer acceleration of the sprayer 10, etc.), boom conditions (e.g., speed of the nozzle assembly 42, deflection magnitude of the assembly 42 from a default position $d_p$, acceleration of the nozzle assembly 42, direction of movement of the nozzle assembly 42 relative to the frame 48 and/or the underlying field 20, etc.), environmental conditions (e.g., wind speed, wind direction, percent humidity, ambient temperature, etc.), and/or any other conditions.

In some embodiments, the nozzle assembly 42 may include one or more nozzles having varied spray characteristics. As such, the nozzle assembly 42 may vary the application region 88 based on the selected nozzle 44. In various examples, the nozzles 44 within each nozzle assembly 42 may correspond to flat fan nozzles configured to dispense a flat fan of the agricultural product. However, in alternative embodiments, the nozzles 44 may correspond to any other suitable types of nozzles, such as dual pattern nozzles and/or hollow cone nozzles.

Figure 8:
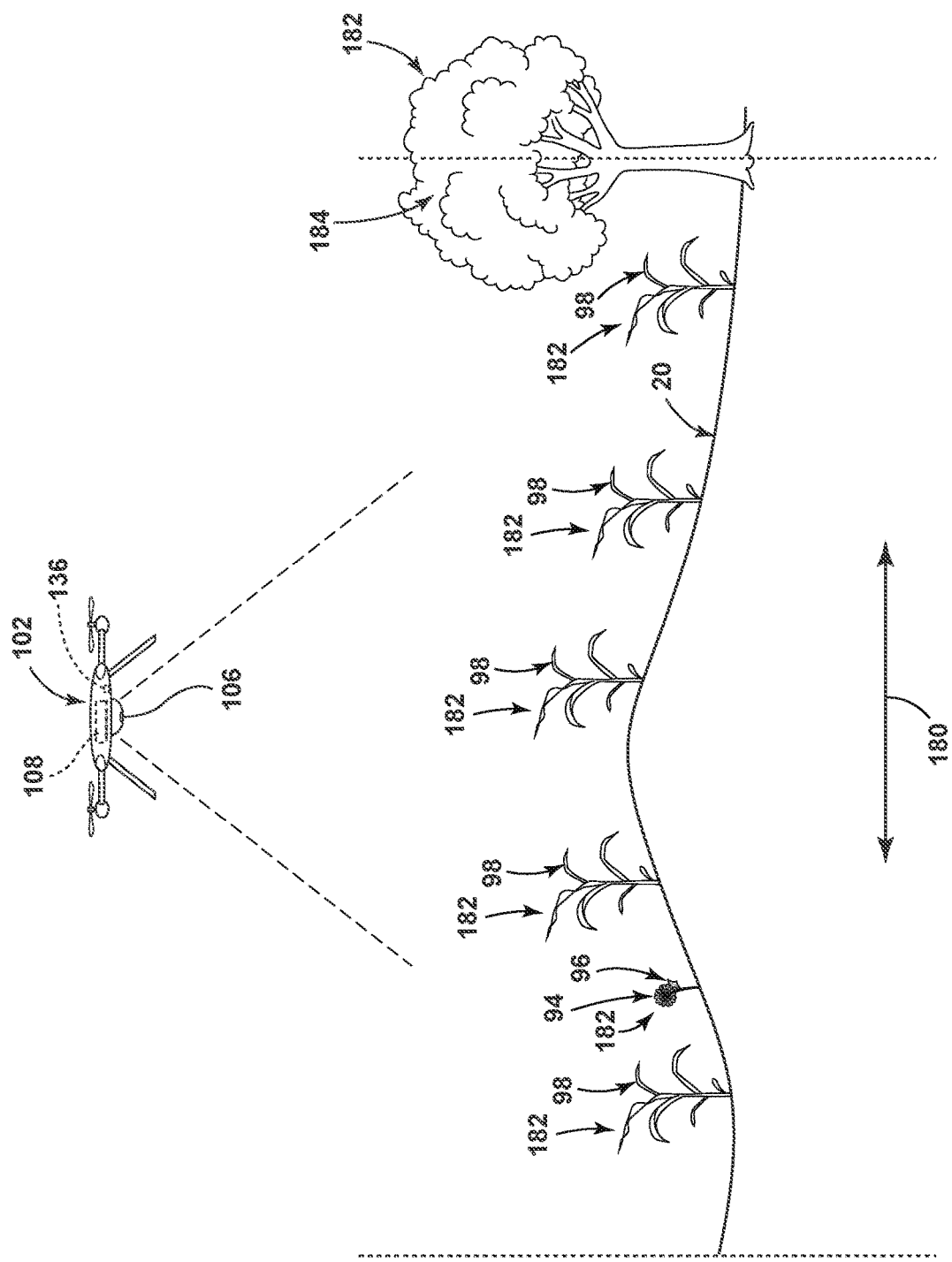
FIG. 8 is a schematic illustration of the first agricultural vehicle capturing post-emergence image data associated with the field following the emergence of plants in accordance with aspects of the present subject matter.

As shown, the boom assembly 40 may further include one or more target sensors 90 configured to capture data indicative of field conditions within the field 20. In several embodiments, the target sensors 90 may be installed or otherwise positioned on one or more boom sections of the boom assembly 40. Furthermore, each target sensor 90 may have a field of view or detection zone 92 (e.g., as indicated by dashed lines in FIG. 4). In this regard, each target sensor 90 may be able to capture data indicative of objects 182 (FIG. 8) and/or field conditions within its detection zone 92. For instance, in some embodiments, the target sensors 90 are object detecting/identifying imaging devices, where the data captured by the target sensors 90 may be indicative of the location and/or type of plants and/or other objects 182 within the field 20. More particularly, in some embodiments, the data captured by the target sensors 90 may be used to allow various objects 182 to be detected. For example, the data captured may allow a computing system 110 (FIG. 5) to distinguish weeds 96 from useful plants within the field 20 (e.g., crops 98). In such instances, the target sensor data may, for instance, be used within a spraying operation to selectively spray or treat a defined target 94, which may include the detected/identified weeds 96 (e.g., with a suitable herbicide) and/or the detected/identified crops 98 (e.g., with a nutrient). In addition, the data captured may allow a computing system 110 to identify one or more landmarks 184 (FIG. 8). In various embodiments, the landmarks 184 may include a tree, a tree line, a building, a tower, and/or the like that may be proximate and/or within the field.

It should be appreciated that the agricultural sprayer 10 may include any suitable number of target sensors 90 and should not be construed as being limited to the number of target sensors 90 shown in FIG. 4. Additionally, it should be appreciated that the target sensors 90 may generally correspond to any suitable sensing devices. For example, each target sensor 90 may correspond to any suitable cameras, such as single-spectrum camera or a multi-spectrum camera configured to capture images, for example, in the visible light range and/or infrared spectral range. Additionally, in various embodiments, the cameras may correspond to a single lens camera configured to capture two-dimensional images or a stereo cameras having two or more lenses with a separate image imaging device for each lens to allow the cameras to capture stereographic or three-dimensional images. Alternatively, the target sensors 90 may correspond to any other suitable image capture devices and/or other imaging devices capable of capturing "images" or other image-like data of the field 20. For example, the target sensors 90 may correspond to or include radio detection and ranging (RADAR) sensors, light detection and ranging (LIDAR) sensors, and/or any other practicable device.

Figure 5:
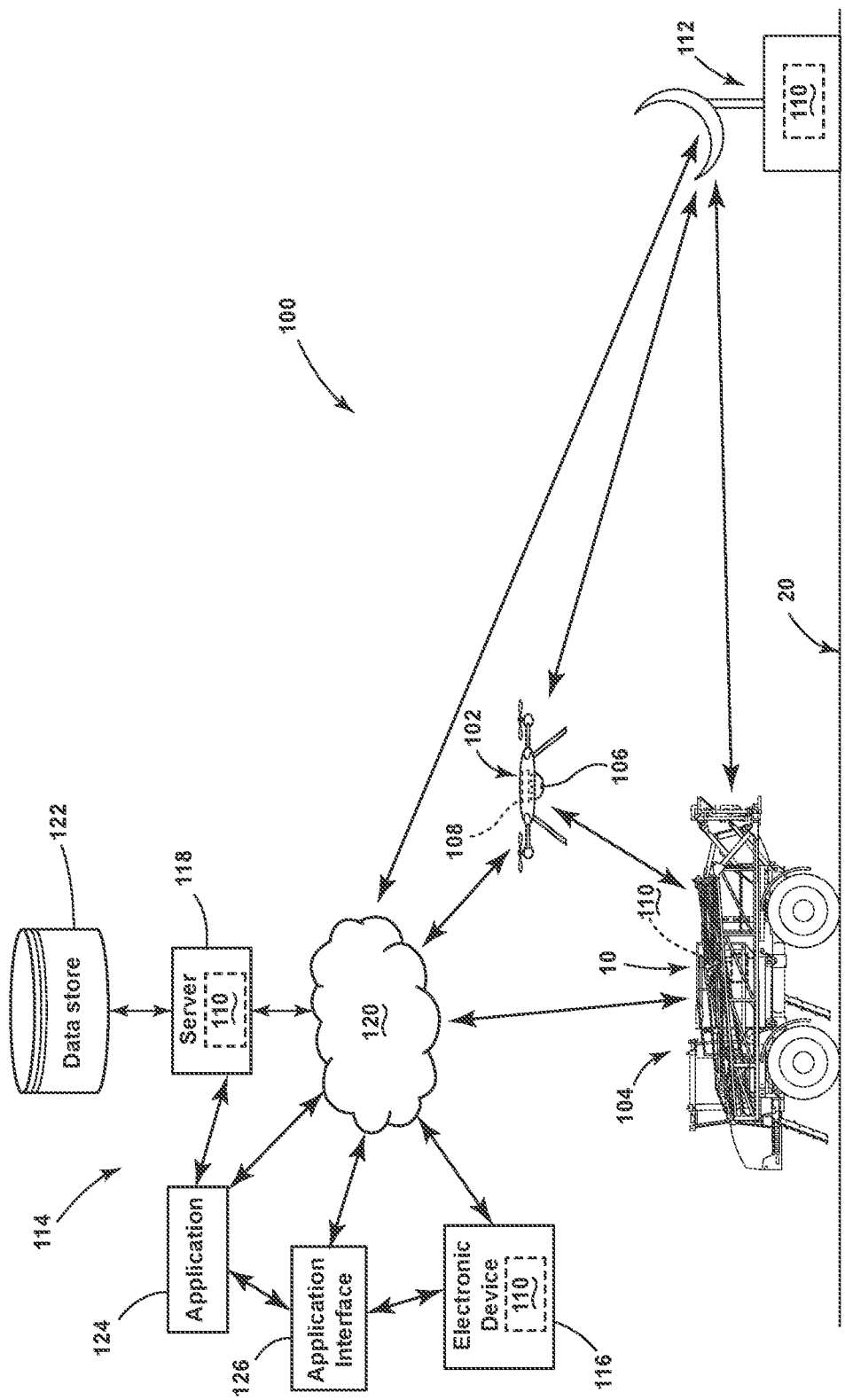
FIG. 5 is a schematic representation of a system various vehicles in accordance with aspects of the present subject matter.

Referring now to FIG. 5, an example view of one embodiment of a system 100 for an agricultural operation is illustrated in accordance with aspects of the present subject matter. As shown in FIG. 5, the system 100 may generally include a first vehicle 102 and a second vehicle 104. In some instances, the first vehicle 102 may be capable of mapping a field 20 and/or identifying one or more objects 182 (FIG. 8) within the field 20. In turn, the second vehicle 104 may be configured to apply an agricultural product to the object, which may be located within the field 20 based on the mapping of the first vehicle 102. By separating the identification of objects 182 (FIG. 8) from the application of an agricultural product thereto may increase the processing speeds of the application operation and/or reduce the materials needed to complete the operation.

In the illustrated example, the first vehicle 102 is configured as one or more unmanned aerial vehicles (UAVs) 102 configured to be flown over the field 20 to allow image data to be collected via an imaging sensor 106 supported on the UAV 102. While the first vehicle described below are generally illustrated and described as a UAV, it will be appreciated that the first vehicle may additionally or alternatively be configured as a tractor, a harvester, a self-propelled windrower, a self-propelled sprayer, and/or the like. In addition, it will be appreciated that the first vehicle may be human-controlled, autonomously controlled, and/or semi-autonomously controlled without departing the scope of the present disclosure.

In several embodiments, the UAV 102 may be flown across the field 20 to allow the one or more imaging sensors 106 to collect image data associated with one or more objects 182 (FIG. 8) within the field 20 and/or a topology for the field 20. For instance, the UAV 102 may be configured to make one or more passes across the field while the field 20 is in a pre-emergence condition (e.g., prior to the performance of a planting operation within the field 20 or following the performance of a planting operation, but prior to the emergence of the plants) to allow the one or more imaging sensors 106 to collect pre-emergence image data associated with the ground surface GS of the field 20. Additionally, the UAV 102 may be configured to make one or more passes across the field 20 while the field 20 is in a post-emergence condition to allow the one or more imaging sensors 106 to collect post-emergence image data associated with the field 20 following the emergence of plants.

In several examples, the imaging sensors 106 may correspond to any suitable cameras, such as single-spectrum camera or a multi-spectrum camera configured to capture image data, for example, in the visible light range and/or infrared spectral range. Additionally, in various embodiments, the cameras may correspond to a single lens camera configured to capture two-dimensional image data or a stereo cameras having two or more lenses with a separate image imaging device for each lens to allow the cameras to capture stereographic or three-dimensional image data. Alternatively, the imaging sensors 106 may correspond to any other suitable image capture devices and/or other imaging devices capable of capturing "image data" or other image-like data of the field 20. For example, the imaging sensors 106 may correspond to or include radio detection and ranging (RADAR) sensors, light detection and ranging (LIDAR) sensors, and/or any other practicable device.

In addition to the one or more imaging sensors 106, the UAV 102 may also support one or more additional components, such as an on-board controller 108. In general, the UAV controller 108 may be configured to control the operation of the UAV 102, such as by controlling the propulsion system 134 of the UAV 102 to cause the UAV 102 to be moved relative to the field 20. For instance, in some embodiments, the UAV controller 108 may be configured to receive flight plan data associated with a proposed flight plan for the UAV 102, such as a flight plan selected such that the UAV 102 makes one or more passes across the field 20 in a manner that allows the one or more imaging sensors 106 to capture image data across at least a portion of the field 20. Based on such data, the UAV controller 108 may automatically control the operation of the UAV 102 such that the UAV 102 is flown across the field 20 according to the proposed flight plan to allow the desired data to be collected by the one or more imaging sensors 106. It should be appreciated that the UAV 102 may generally correspond to any suitable aerial vehicle capable of unmanned flight, such as any UAV capable of controlled vertical, or nearly vertical, takeoffs and landings. For instance, in the illustrated embodiment, the UAV 102 corresponds to a quadcopter. However, in other embodiments, the UAV 102 may correspond to any other multi-rotor aerial vehicle, such as a tricopter, hexacopter, or octocopter. In still further embodiments, the UAV 102 may be a single-rotor helicopter, or a fixed wing, hybrid vertical takeoff, and landing aircraft. Still further, it will be appreciated that the first vehicle 102 may be implemented as any other vehicle capable of performing any of the functions described herein without departing from the scope of the present disclosure.

Moreover, in some embodiments, the second vehicle 104 may be implemented as one or more second vehicles 104 configured to perform a treatment operation during which one or more agricultural products (e.g., fertilizers, herbicides, pesticides, and/or the like) are applied to the field 20. For instance, the agricultural vehicle 10 may correspond to the agricultural sprayer 10 described herein. Alternatively, the vehicle 10 may correspond to any other suitable vehicle configured to apply or deliver an agricultural product to the field 20, such as a granular fertilizer applicator, etc. As indicated above, the system 100 may allow for a localized treatment prescription(s) to be generated based at least partially on the image data collected by the UAV 102. In such instances, during the performance of a treatment operation, the agricultural vehicle 10 may, for example, be controlled to allow an agricultural product to be applied to specific areas within the field 20 based on the detection of a weed 96 within that area by the UAV 102.

Additionally, as shown in FIG. 5, the disclosed system 100 may also include one or more remote computing systems 110 separate from or remote to the UAV 102. In several embodiments, the one or more remote computing systems 110 may be communicatively coupled to the UAV controller 108 to allow data to be transmitted between the UAV 102 and the one or more remote computing systems 110. For instance, in various embodiments, the one or more remote computing systems 110 may be configured to transmit instructions or data to the UAV controller 108 associated with the desired flight plan across the field 20. Similarly, the UAV controller 108 may be configured to transmit or deliver the data collected by the one or more imaging sensors 106 to the one or more remote computing systems 110.

It should be appreciated that the one or more remote computing systems 110 may correspond to a stand-alone component or may be incorporated into or form part of a separate component or assembly of components. For example, in various embodiments, the one or more remote computing systems 110 may form part of a base station 112. In such an embodiment, the base station 112 may be disposed at a fixed location, such as a farm building or central control center, which may be proximal or remote to the field 20, or the base station 112 may be portable, such as by being transportable to a location within or near the field 20. In addition to the base station 112 (or an alternative thereto), the one or more remote computing systems 110 may form part of an agricultural vehicle, such as the agricultural vehicle 10 described above (e.g., a sprayer, granular fertilizer applicator, etc.). For instance, the one or more remote computing systems 110 may correspond to a vehicle controller provided in operative association with the second vehicle 104 and/or an implement controller provided in operative association with a corresponding implement of the second vehicle 104.

In other embodiments, the one or more remote computing systems 110 may correspond to or form part of a remote cloud-based system 114. For instance, the first vehicle 102, the second vehicle 104, the base station 112, and/or an electronic device 116 may be communicatively coupled with one another and/or one or more remote sites, such as a remote server 118 via a network/cloud 120 to provide data and/or other information therebetween. The network/cloud 120 represents one or more systems by which the first vehicle 102, the second vehicle 104, the base station 112, and/or the electronic device 116 may communicate with the remote server 118. The network/cloud 120 may be one or more of various wired or wireless communication mechanisms, including any desired combination of wired and/or wireless communication mechanisms and any desired network topology (or topologies when multiple communication mechanisms are utilized). Exemplary communication networks 120 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 302 in FIG. 5). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 120.

The server 118 may be one or more computing devices, each of which may include at least one processor and at least one memory, the memory storing instructions executable by the processor, including instructions for carrying out various steps and processes. The server 118 may include or be communicatively coupled to a data store 122 for storing collected data as well as instructions for the first vehicle 102, the second vehicle 104, the base station 112, and/or the electronic device 116 with or without intervention from a user, the first vehicle 102, the second vehicle 104, the base station 112, and/or the electronic device 116. Moreover, the server 118 may be capable of analyzing initial or raw sensor data received from the first vehicle 102, the second vehicle 104, the electronic device 116, and/or the base station 112, and final or post-processing data (as well as any intermediate data created during data processing). Accordingly, the instructions provided to any one or more of the first vehicle 102, the second vehicle 104, the base station 112, and/or the electronic device 116 may be determined and generated by the server 118 and/or one or more cloud-based applications 124. In such instances, a user interface of the first vehicle 102, a user interface of the second vehicle 104, and/or the electronic device 116 may be a dummy device that provides various notifications based on instructions from the network/cloud 120.

With further reference to FIG. 5, the server 118 also generally implements features that may enable the first vehicle 102, the second vehicle 104, the base station 112, and/or the electronic device 116 to communicate with cloud-based applications 124. Communications from the electronic device 116 can be directed through the network/cloud 120 to the server 118 and/or cloud-based applications 124 with or without a networking device, such as a router and/or modem. Additionally, communications from the cloud-based applications 124, even though these communications may indicate one the first vehicle 102, the second vehicle 104, the base station 112, and/or the electronic device 116 as an intended recipient, can also be directed to the server 118. The cloud-based applications 124 are generally any appropriate services or applications 124 that are accessible through any part of the network/cloud 120 and may be capable of interacting with the electronic device 116.

In various examples, the first vehicle 102, the second vehicle 104, the base station 112, and/or the electronic device 116 can be feature-rich with respect to communication capabilities, i.e. have built-in capabilities to access the network/cloud 120 and any of the cloud-based applications 124 or can be loaded with, or programmed to have, such capabilities. The first vehicle 102, the second vehicle 104, the base station 112, and/or the electronic device 116 can also access any part of the network/cloud 120 through industry-standard wired or wireless access points, cell phone cells, or network nodes. In some examples, users can register to use the remote server 118 through the first vehicle 102, the second vehicle 104, the base station 112, and/or the electronic device 116, which may provide access to the first vehicle 102, the second vehicle 104, the base station 112, and/or the electronic device 116 and/or thereby allow the server 118 to communicate directly or indirectly with the first vehicle 102, the second vehicle 104, the base station 112, and/or the electronic device 116. In various instances, the first vehicle 102, the second vehicle 104, the base station 112, and/or the electronic device 116 may also communicate directly, or indirectly, with the first vehicle 102, the second vehicle 104, the base station 112, and/or the electronic device 116 or one of the cloud-based applications 124 in addition to communicating with or through the server 118. According to some examples, the first vehicle 102, the second vehicle 104, the base station 112, and/or the electronic device 116 can be preconfigured at the time of manufacture with a communication address (e.g. a URL, an IP address, etc.) for communicating with the server 118 and may or may not have the ability to upgrade or change or add to the preconfigured communication address.

Referring still to FIG. 5, when a new cloud-based application 124 is developed and introduced, the server 118 can be upgraded to be able to receive communications for the new cloud-based application 124 and to translate communications between the new protocol and the protocol used by the first vehicle 102, the second vehicle 104, the base station 112, and/or the electronic device 116. The flexibility, scalability, and upgradeability of current server technology render the task of adding new cloud-based application protocols to the server 118 relatively quick and easy.

In several embodiments, an application interface 126 may be operably coupled with the cloud 302 and/or the application 124. The application interface 126 may be configured to receive data related to the first vehicle 102, the second vehicle 104, the base station 112, and/or the electronic device 116. In various embodiments, one or more inputs related to the field data may be provided to the application interface 126. For example, a farmer, a vehicle user, a company, or other persons may access the application interface 126 to enter the inputs related to the field data. Additionally or alternatively, the inputs related to the field data may be received from a remote server 118. For example, the inputs related to the field data may be received in the form of software that can include one or more objects 182 (FIG. 8), agents, lines of code, threads, subroutines, databases, application programming interfaces (APIs), or other suitable data structures, source code (human-readable), object code (machine-readable). In response, the system 100 may update any input/output based on the received inputs. The application interface 126 can be implemented in hardware, software, or a suitable combination of hardware and software, and which can be one or more software systems operating on a general-purpose processor platform, a digital signal processor platform, or other suitable processors.

In some examples, at various predefined periods and/or times, the first vehicle 102, the second vehicle 104, the base station 112, and/or the electronic device 116 may communicate with the server 118 through the network/cloud 120 to obtain the stored instructions, if any exist. Upon receiving the stored instructions, the first vehicle 102, the second vehicle 104, the base station 112, and/or the electronic device 116 may implement the instructions. In some instances, the first vehicle 102, the second vehicle 104, the base station 112, and/or the electronic device 116 can send event-related data to the server 118 for storage in the data store 122. This collection of event-related data can be accessed by any number of users, the first vehicle 102, the second vehicle 104, the base station 112, and/or the electronic device 116 to assist with application processes.

In some instances, the electronic device 116 may also access the server 118 to obtain information related to stored events. The electronic device 116 may be a mobile device, tablet computer, laptop computer, desktop computer, watch, virtual reality device, television, monitor, or any other computing device or another visual device.

In various embodiments, the data used by the first vehicle 102, the second vehicle 104, the electronic device 116, the remote server 118, the data store 122, the application 124, the application interface 126, the electronic device 116, and/or any other component described herein for any purpose may be based on data provided by the one or more sensors operably coupled with the first vehicle 102 (e.g., the imaging sensor 106 or other sensor (FIG. 6), the one or more sensors operably coupled with the second vehicle 104 (e.g., the target sensor 90 (FIG. 4), and/or third-party data that may be converted into comparable data that may be used independently or in conjunction with data collected from the one or more sensors operably coupled with the first vehicle 102 and/or the one or more sensors operably coupled with the second vehicle 104.

In various embodiments, based on the data collected during a first operation performed by the first vehicle 102, the system 100 may be configured to identify one or more objects 182 (FIG. 8) within the image data as a target 94 (FIG. 8). In addition, the system 100 may be configured to identify one or more objects 182 (FIG. 8) within the image data as a landmark 184 (FIG. 8). Once a target 94 (FIG. 8) and a landmark 184 (FIG. 8) are identified within image data from the first vehicle 102, the system 100 may be configured to determine a location of the target 94 (FIG. 8) relative to the landmark 184 (FIG. 8) to geolocate the target 94 (FIG. 8). In turn, the system 100 may be configured to generate a control command for a second vehicle 104 with the control command including the location of the target 94 (FIG. 8) relative to the landmark 184 (FIG. 8) within the field 20. In addition to receiving the control command, the second vehicle 104 may also receive mapping data based on the image data from the first vehicle 102. Based on a correlation of the image data from the first vehicle 102 with image data captured by one or more target sensors 90 of the second vehicle 104, a common location of a landmark 184 (FIG. 8) may be identified. Based on a common landmark 184 (FIG. 8) being identified, a position of the target 94 (FIG. 8) relative to the second vehicle 104 may be determined. Once the target 94 (FIG. 8) is within an application region 88 (FIG. 4) of a nozzle assembly 42 (FIG. 4), the nozzle assembly 42 may be actuated to exhaust an agricultural product onto the target 94 (FIG. 8). In some instances, the mapping data may also include topology data of the field 20. In such instances, a predicted deflection model may be generated which may assist in locating of the target 94 (FIG. 8) based on the image data from the imaging sensor 106 and the image data from the target sensor 90 as the boom assembly 40 (FIG. 4) may be deflected from a default position based on the topology of the field 20.

In various examples, the server 118 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the server 118 through the network/cloud 120 and may be used to generate a predictive evaluation of the field 20. In some instances, the machine learning engine may allow for changes to a map of the field 20 to be updated without human intervention.

Figure 6:
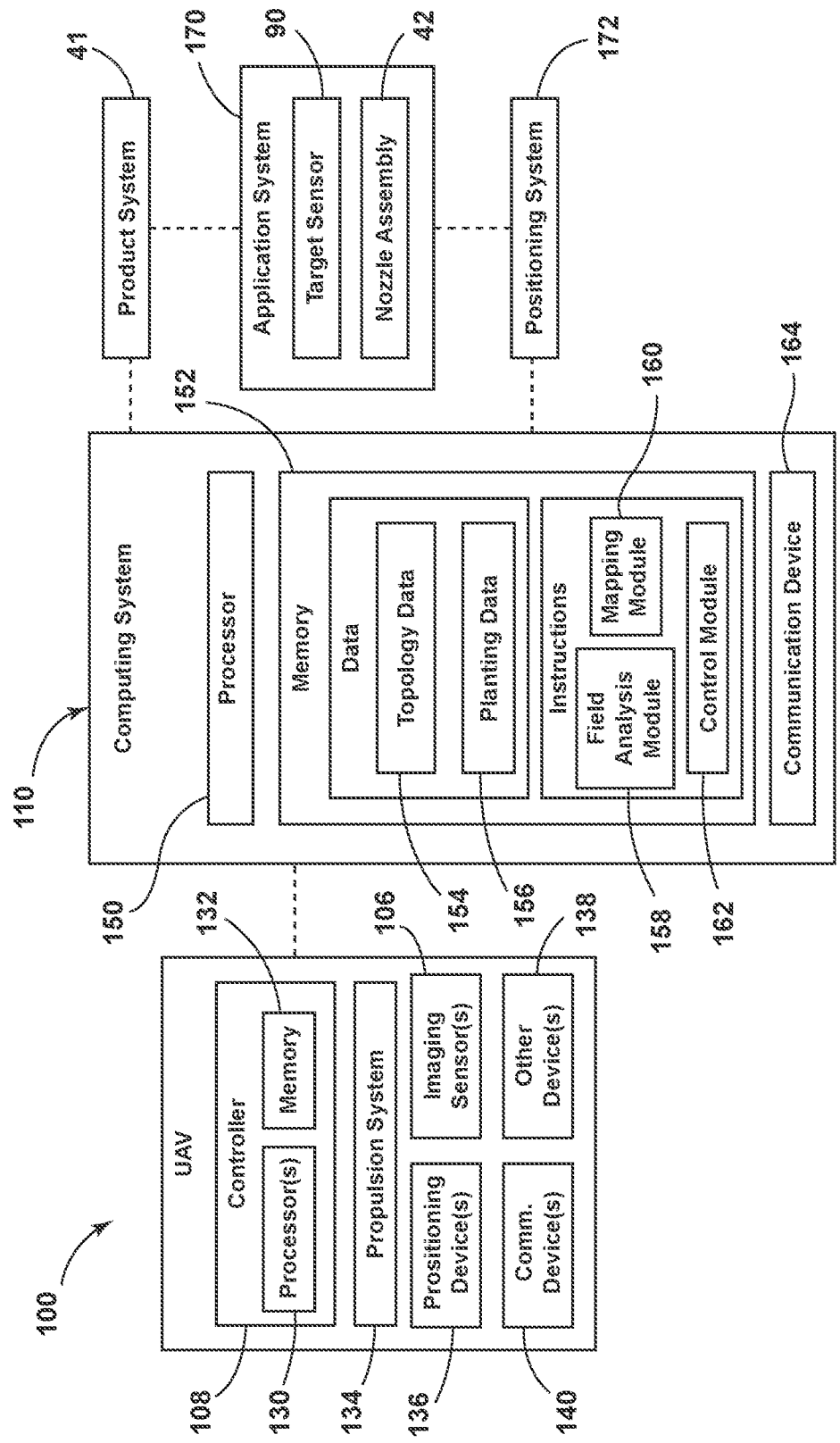
FIG. 6 illustrates a block diagram of various components of the system of FIG. 5 in accordance with aspects of the present subject matter.

Referring now to FIG. 6, a schematic view of the UAV 102 and the remote computing system 110 are illustrated in accordance with aspects of the present disclosure. It should be appreciated, however, that, in other embodiments, the disclosed system 100 may have any other suitable system configuration or architecture and/or may incorporate any other suitable components and/or combination of components that generally allow the system 100 to function as described herein.

As shown, the system 100 may include one or more UAVs, such as the UAV 102 described above with reference to FIG. 5. In general, the UAV 102 may include and/or be configured to support various components, such as one or more sensors, controllers, and propulsion systems. For instance, as indicated above, the UAV 102 may be provided in operative association with one or more imaging sensors 106 configured to capture or collect data associated with the field 20 over which the UAV 102 is being flown.

Additionally, as indicated above, the UAV 102 may also include a controller 108. In general, the UAV controller 108 may correspond to any suitable processor-based device(s), such as a computing device or any combination of computing devices. Thus, in several embodiments, the UAV controller 108 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the UAV controller 108 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the UAV controller 108 to perform various computer-implemented functions. It should be appreciated that the UAV controller 108 may also include various other suitable components, such as a communications circuit or module, a network interface, one or more input/output channels, a data/control bus, and/or the like.

In several embodiments, the UAV controller 108 may be configured to automatically control the operation of a propulsion system 134 of the UAV 102. For instance, as indicated above, the UAV controller 108 may be configured to automatically control the propulsion system 134 in a manner that allows the UAV 102 to be flown across a field 20 according to a predetermined or desired flight plan. In this regard, the propulsion system 134 may include any suitable components that allow for the trajectory, speed, and/or altitude of the UAV 102 to be regulated, such as one or more power sources (e.g., one or more batteries), one or more drive sources (e.g., one or more motors and/or engines), and one or more lift/steering sources (e.g., propellers, blades, wings, rotors, and/or the like).

Additionally, as shown in FIG. 6, the UAV 102 may also include one or more positioning device(s) 136. In various embodiments, the positioning device(s) 136 may be configured to determine the exact location of the UAV 102 within the field 20 using a satellite navigation position system (e.g. a GPS, a Galileo positioning system, the Global Navigation satellite system (GLONASS), the BeiDou Satellite Navigation and Positioning system, and/or the like) and/or a dead reckoning device. In such embodiments, the location determined by the positioning device(s) 136 may be transmitted to the UAV controller 108 (e.g., in the form coordinates) and stored within the controller's memory for subsequent processing and/or analysis. By continuously monitoring the location of the UAV 102 as a pass is being made across the field 20, the sensor data acquired via the one or more imaging sensors 106 may be geo-located within the field 20. For instance, in various embodiments, the location coordinates derived from the positioning device(s) 136 and the sensor data generated by the one or more imaging sensors 106 may both be time-stamped. In such an embodiment, the time-stamped data may allow the sensor data to be matched or correlated to a corresponding set of location coordinates received or derived from the positioning device(s) 136, thereby allowing a field map to be generated that locates various objects 182 (FIG. 8), such as targets 94 (FIG. 8) and landmarks 184 (FIG. 8), within the field 20 relative to one another.

It should be appreciated that the UAV 102 may also include any other suitable components. For instance, in addition to the one or more imaging sensors 106, the UAV 102 may also include various other sensors 138, such as one or more inertial measurement units for monitoring the orientation of the UAV 102 and/or one or more altitude sensors for monitoring the pose of the UAV 102 relative to the ground. As used herein, "pose" includes the position and orientation of an object, such as the position and orientation of a vehicle, in some reference frame. Moreover, the UAV 102 may include a communications device(s) 140 to allow the UAV controller 108 to be communicatively coupled to one or more other system components. The communications device 140 may, for example, be configured as a wireless communications device (e.g., an antenna or transceiver) to allow for the transmission of wireless communications between the UAV controller 108 and one or more other remote system components.

As shown in FIG. 6, the system 100 may also include one or more computing systems 110 or controllers remote to the UAV 102, such as the one or more remote computing systems 110 described above with reference to FIG. 5. In general, the one or more remote computing systems 110 may be configured to be in communication with one or more components of the UAV 102 to allow data to be transferred between the UAV 102 and the one or more remote computing systems 110, such as sensor data collected via the one or more imaging sensors 106. As indicated above, the one or more remote computing systems 110 may correspond to a stand-alone component or may be incorporated into or form part of a separate component or assembly of components. For example, the one or more remote computing systems 110 may be incorporated into or form part of a base station 112 and/or a cloud computing system 300. In addition, or as an alternative thereto, the one or more remote computing systems 110 may correspond to a component of the second vehicle 104 and/or an associated implement towed by the second vehicle 104, such as by corresponding to a vehicle controller and/or an implement controller.

Similar to the UAV controller 108, the one or more remote computing systems 110 may be configured as any suitable processor-based device(s), such as a computing device or any combination of computing devices. As such, the one or more remote computing systems 110 may include one or more processor(s) 150 and associated memory device(s) 152 configured to perform a variety of computer-implemented functions. The memory device(s) 152 may generally be configured to store suitable computer-readable instructions that, when implemented by the processor(s) 150, configure the one or more remote computing systems 110 to perform various computer-implemented functions. It should be appreciated that the one or more remote computing systems 110 may also include various other suitable components, such as a communications circuit or module, a network interface, one or more input/output channels, a data/control bus, and/or the like.

In various embodiments, the memory device(s) 152 of the one or more remote computing systems 110 may include one or more databases for storing crop management information. For instance, as shown in FIG. 6, the memory device(s) 152 may include a topology database 154 storing data received from the one or more imaging sensors 106. As noted above, the one or more imaging sensors 106 may be used to capture data indicative of the topology of the field 20. For instance, topology data may be captured while the field 20 is in a pre-emergence condition (e.g., prior to a seed planting operation in the field 20 or following such operation but prior to the emergence of the plants).

Additionally or alternatively, the memory device(s) 152 may include a field database 156 storing image data associated with the field 20. For instance, the image data may be raw or processed data of one or more portions of the field 20. The field database 156 may also store various forms of data that a related to the identified objects 182 (FIG. 8) within and/or proximate to the field 20. For example, the objects 182 (FIG. 8) may include targets 94 (FIG. 8) and/or landmarks 184 (FIG. 8) that may be used to relocate the targets 94 (FIG. 8) during a subsequent operation.

Referring still to FIG. 6, in several embodiments, the instructions stored within the memory device(s) 152 of the computing system 110 may be executed by the processor(s) 150 to implement a field analysis module 158. In general, the field analysis module 158 may be configured to analyze the field data from the one or more imaging sensors 106 to allow the one or more remote computing systems 110 to identify one or more objects 182 (FIG. 8), such as a target 94 (FIG. 8) and/or a landmark 184 (FIG. 8), within the field 20. For instance, in several embodiments, the field analysis module 158 may be configured to analyze/process the data to detect/identify the type of various objects 182 (FIG. 8) in the field 20. In this regard, the computing system 110 may include any suitable image processing algorithms stored within its memory 152 or may otherwise use any suitable image processing techniques to determine, for example, the presence of objects 182 (FIG. 8) within the field 20 based on the field data. For instance, in some embodiments, the computing system 110 may be able to distinguish between weeds 96 and emerging/standing crops 98 (FIG. 3). Additionally or alternatively, in some embodiments, the computing system 110 may be configured to distinguish between weeds 96 and emerging/standing crops 98, such as by identifying crop rows of emerging/standing crops 98 and then inferring that plants positioned between adjacent crop rows are weeds 96.

Additionally or alternatively, the field analysis module 158 may be configured to analyze the topology data to create a topology map. In some instances, the field analysis module 158 may also predict a deflection model of the boom assembly at various locations within the field 20 based on the topology. For instance, the topology map may identify one or more terrain variations that may cause the boom assembly 40 to deflect while in use.

Moreover, the instructions stored within the memory device(s) 152 of the computing system 110 may be executed by the processor(s) 150 to implement a mapping module 160 that is configured to generate one or more maps of the field 20 based on the field data and/or the topology data. It should be appreciated that, as used herein, a "map" may generally correspond to any suitable dataset that correlates data to various locations within a field 20. Thus, for example, a map may simply correspond to a data table that correlates field contour or topology data to various locations within the field 20 or may correspond to a more complex data structure, such as a geospatial numerical model that can be used to identify various objects 182 (FIG. 8) in the field data and/or topology data and determine a position of each object within the field 20, which may, for instance, then be used to generate a graphically displayed map or visual indicator.

Referring still to FIG. 6, in some embodiments, the instructions 216 stored within the memory 212 of the computing system 110 may also be executed by the processor(s) 150 to implement a control module 162. In general, the control module 162 may be configured to electronically control the operation of one or more components of the second vehicle 104. For instance, the second vehicle 104 may be configured to selectively spray various targets 94 (FIG. 8).

Further, as shown in FIG. 6, the computing system 110 may also include a communications device(s) 164 to allow for the computing system 110 to communicate with an application system 170. For instance, one or more communicative links or interfaces (e.g., one or more data buses) may be provided between the communications device(s) 164 and the application system 170.

As illustrated, the application system 170 may be configured to dispense an agricultural product from the product system 41 to the field 20 through one or more nozzle assemblies 42 that is positioned at least partially along the boom assembly 40. It will be appreciated that the application system 170 can include any number of nozzle assemblies 42 without departing from the scope of the present disclosure.

In addition, one or more target sensors 90 may be associated with each respective nozzle 44 and configured to capture images of a portion of the field 20 (FIG. 1). In various embodiments, each target sensor 90 may have a detection zone 92 (FIG. 3) that at least partially overlaps with an application region 88 (FIG. 3) of a nozzle 44 such that the target sensor 90 can provide data related to an object being positioned externally and/or internally of the application region 88 of the fan 86. As discussed above, in several embodiments, the one or more target sensors 90 may correspond to a camera for capturing two-dimensional and/or three-dimensional images of the field 20. In several embodiments, the computing system 110 may be configured to receive and process data captured by the target sensors 90 to allow one or more objects 182 (FIG. 8) within imaged portions of the field 20 to be determined. For instance, once the field analysis module 158 identifies an object is defined as a target 94 (FIG. 8) (e.g., a weed 96, a crop 98, etc.), the mapping module 160 may geolocate the target 94 (FIG. 8) so that the second vehicle 104 can relocate the target 94 (FIG. 8) for treatment applications. In such instances, the mapping module 160 may combine image data based on overlapping features within successive images to complete an image field map with marked objects 182 (FIG. 8) within the field map generated by the mapping module 160.

In some instances, the computing system 110 may be communicatively coupled to a positioning system 172 that is configured determine the location of the second vehicle 104 by using a GPS system, a Galileo positioning system, the Global Navigation satellite system (GLONASS), the BeiDou Satellite Navigation and Positioning system, a dead reckoning system, and/or the like. In such embodiments, the location determined by the positioning system 172 may be transmitted to the computing system 110 (e.g., in the form location coordinates) and subsequently stored within a suitable database for subsequent processing and/or analysis.

In some embodiments, the system 100 may use simultaneous localization and mapping (SLAM) and/or visual simultaneous localization and mapping (VSLAM) techniques to construct and update the field map by capturing image data while simultaneously keeping track of the UAV's location relative to the field 20. For example, the computing system 110 may identify objects 182 (FIG. 8) (e.g., targets 94 (FIG. 8), landmarks 184 (FIG. 8), etc.) within the captured image, estimate the dimensions and scale of the objects 182 (FIG. 8) in the image, compare the identified objects 182 (FIG. 8) to each other and/or to features in test images having known dimensions and scale, and identify correspondences based on the comparisons. Each correspondence may be a value set or an information structure that identifies an object (or object point) in one image as having a high probability of being the same object in another image. Said another way, a correspondence may be a set of image points (e.g., a first point in a first image and a second point in a second image, etc.) that are in correspondence. The system 100 may produce a homography matrix information structure based on the identified correspondences, and use the homography matrix to determine the position, orientation, etc. of the objects 182 (FIG. 8) and the UAV 102 relative to the field 20 to create a field map.

In turn, the computing system 110 may identify objects 182 (FIG. 8) (e.g., targets 94 (FIG. 8), landmarks 184 (FIG. 8), etc.) within the captured images from the target sensors 90 while the second vehicle 104 is in use, compare the identified objects 182 (FIG. 8) to each other and/or to the field map, and identify correspondences based on the comparisons. Each correspondence may be a value set or an information structure that identifies an object (or object point) in one image as having a high probability of being the same object in another image. The system 100 may produce a homography matrix information structure based on the identified correspondences, and use the homography matrix to determine the position, orientation, etc. of the objects 182 (FIG. 8) and the second vehicle 104 relative to the field 20.

In general, VSLAM algorithms take account of a variety of parameters, such as sensor information, map representation, device dynamics, environmental dynamics, and the integration of sensor measurements and the UAV's control system over time. Mapping the spatial information of the field 20 generally includes employing spatial sensors (e.g., position device(s)) to which VSLAM algorithms may be applied. For example, landmarks 184 (FIG. 8) may be extracted from images obtained by the one or more imaging sensors 106.

The system 100 may use such movement or distance information to determine a distance between captured images or frames, and use such distance information in conjunction with the homography matrix to estimate the dimensions and scale of the objects 182 (FIG. 8) in the frames. This in turn allows the UAV 102 to determine its location with a higher degree of precision and accuracy than if the location is determined based on captured images. For example, the UAV 102 may use position data from a dead reckoning device for determining the distance that the UAV 102 traveled between images/frames.

In various embodiments, the positioning device(s) 136 of the UAV 102 may be equipped with an optical flow sensor that collects and/or produces optical flow sensor data that may be used by a processor 130, 150 of the system 100 to determine the distance traveled. For example, the processor 130 of the UAV 102 may be configured to receive a first image frame, receive a second image frame, generate homograph computation values based on the first image frame and the second image frame, receive optical flow sensor data from an optical flow sensor, determine a scale estimation value based on the homograph computation values and the optical flow sensor data, and use the scale estimation value to determine the UAV location.

In various embodiments, navigation of the UAV 102 may be performed autonomously using systems that rely on VSLAM techniques. While the localization and mapping processes may be performed simultaneously, the processes may instead be performed sequentially, such as in a multiplexed fashion. For example, a computing system 110 may use the same data to both localize a UAV 102 within a map and to generate or update the map.

The computing system may employ algorithms to solve the computational problem of constructing or updating a map of an unknown environment while simultaneously keeping track of a robotic device's location within the map. The computing system may track a set of points through sensor inputs (e.g., camera or video frames), and use estimated locations of the tracked points to calculate the location from which the UAV 102 could have observed or measured the points while simultaneously constructing or updating a map based on the tracked point locations in three-dimensional space.

In some embodiments, the system may include a multi-core processor configured to accomplish VSLAM by separating the localization and mapping functions onto different threads. For example, localization (i.e., current location estimation) may be performed in real-time on the UAV controller 108, while the mapping thread runs processes in the background on the computing system 110 to minimize the differences between the tracked point locations and where the points are expected to be given the pose estimate (i.e., reprojection errors). On completion, the mapping thread may update the information used to track the set of points, and in turn, the localization thread adds new observations to expand the map.

The field map may then be provided to the control module 162. With the field map, the control module 162 may utilize a target sensor 90 and compare data from the target sensor 90 to the field map to localize the pose of the second vehicle 104 relative to the field map. In some instances, one or more landmarks 184 (FIG. 8) and/or targets 94 (FIG. 8) may be detected and utilized for determining a pose of the second vehicle 104 within the field 20. Once a location is determined, the second vehicle 104 may move to the appropriate location of the field 20 to treat the target 94 (FIG. 8).

It should be appreciated that, although the various control functions and/or actions were generally described above as being executed by one of the controllers of the system (e.g., the UAV controller 108 or the one or more remote computing systems 110, such control functions/actions may generally be executed by either of such controllers 108, 110 and/or may be distributed across both of the controllers 108, 110. For instance, in an alternative embodiment, the height analysis module 148 may be executed by the UAV controller 108 to assess the topology data collected by the one or more imaging sensors 106. Similarly, in another alternative embodiment, the operation of the UAV 102 (e.g., the operation of the propulsion system 134) may be controlled by the one or more remote computing systems 110 as opposed to the UAV controller 108.

Figure 7:
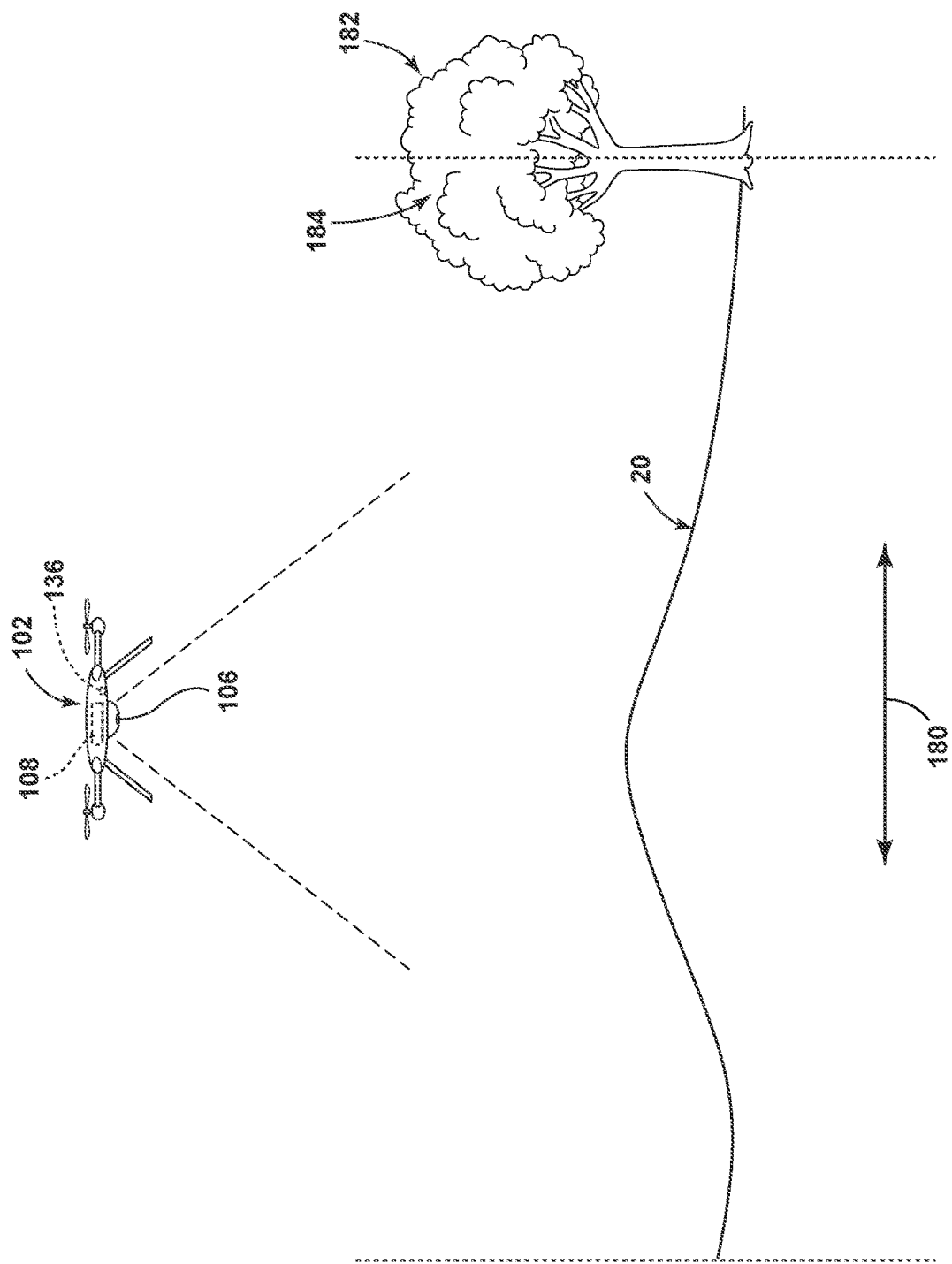
FIG. 7 is a schematic illustration of the first agricultural vehicle capturing pre-emergence image data associated with a ground surface of a field in accordance with aspects of the present subject matter.

Referring now to FIGS. 7 and 8, example views of a UAV 102 making several different passes over various portions of a field 20 to collect topology data and/or field data associated the field 20 is illustrated in accordance with aspects of the present subject matter. Specifically, FIG. 7 illustrates the UAV 102 making an initial pass when the field 20 is in a pre-emergence condition generally along the line 180. FIG. 8 illustrates the UAV 102 making a pass over the field 20 generally along the line 180 in which a target 94 in the form of a weed 96 is detected.

As shown in FIG. 7, during the pre-emergence pass, the UAV 102 may be flown across the field 20 to capture topology data (via the one or more imaging sensors 106) that is indicative of the topology of the ground surface GS of the field 20. As indicated above, such pre-emergence data may be used to create a field contour map representing the ground surface topology.

As shown in FIG. 8, in some instances, the UAV 102 may also make a pass along the field 20 in which one or more objects 182 are detected. For example, in the embodiment illustrated in FIG. 8, the objects 182 may include crops 98, a weed 96, and a landmark 184. As provided herein, as the UAV 102 moves along the field 20, image data from the one or more imaging sensors 106 and position data from the one or more positioning device(s) 136 may be provided to the computing system 110. In turn, the computing system 110 may detect the one or more objects 182 within the data. For instance, in some embodiments, the system 100 may be able to distinguish between weeds 96, emerging/standing crops 98, and landmarks 184. Additionally or alternatively, in some embodiments, the system 100 may be configured to distinguish between weeds 96 (or landmarks 184) and emerging/standing crops 98, such as by identifying crop rows of emerging/standing crops 98 and then inferring that objects 182 positioned between adjacent crop rows are weeds 96 (or landmarks 184).

Figure 9:
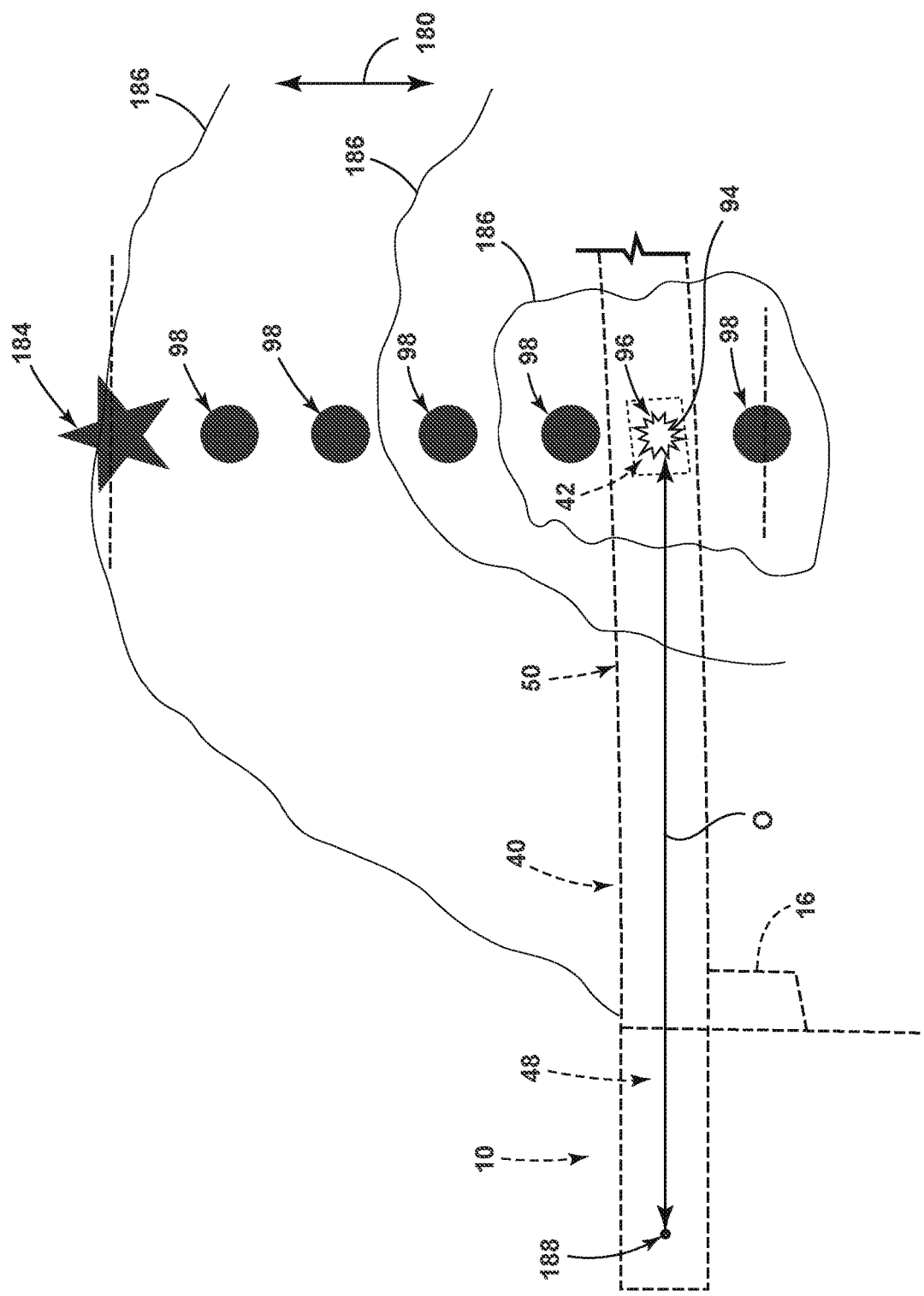
FIG. 9 is a top schematic illustration of the field with a second vehicle performing a spray operation on a target in accordance with aspects of the present subject matter.

Referring now to FIG. 9, an exemplary portion of a field map is illustrated in accordance with various aspects of the present disclosure. As provided herein, based on the data provided from the UAV 102 to the computing system 110, a map may be generated of the field 20 with objects 182 defined therein that are geolocated relative to one another. The map may also include contour lines 186 of the field 20 illustrating terrain variations and/or objects 182 within the field 20.

During operation of the second vehicle 104, the target sensors 90 may capture image data of the field 20. The image data from the target sensors 90 may be compared to the field map to determine a location of the second vehicle 104 within the field 20. Once the location of the second vehicle 104 within the field 20 is established, the vehicle may be directed to the target 94, which may be accomplished manually or autonomously manually.

As the second vehicle 104 approaches the target 94, a lateral offset O of the target 94 relative to a reference point 188 along the boom assembly 40 may be determined. In some instances, the reference point 188 may define a center point of the boom assembly 40 in a lateral direction 56. Based on the lateral offset, the computing system 110 may determine which nozzle assembly 42 along the boom assembly 40 to actuate as discussed herein.

In addition, based on the field map, a deflection model of the boom assembly based on the second vehicle's location relative to the target 94 may be determined. For example, if the second vehicle 104 approaches the target 94 from a first direction, the boom assembly 40 may have a first magnitude and direction of deflection. Conversely, if the second vehicle 104 approaches the target 94 from a second direction, the boom assembly 40 may have a second magnitude and direction of deflection. As such, as the boom assembly 40 approaches a target 94, the boom deflection model may be predicted to further increase the precision of the application of agricultural product to the target 94, such as the weed 96.

Based on the predicted deflection and the lateral offset from the reference point 188, an upcoming activation time for one or more nozzle assemblies 42 to exhaust the agricultural product on a defined target 94 may be defined. For instance, a first activation time may be defined if the boom assembly 40 is generally aligned along a default axis, a second activation time may be defined if the boom assembly 40 is fore of the default axis, and a third activation time may be defined if the boom assembly 40 is aft of the default axis. Once the activation time occurs, the one or more nozzle assemblies may be actuated to apply the agricultural product to the target 94.

Figure 10:
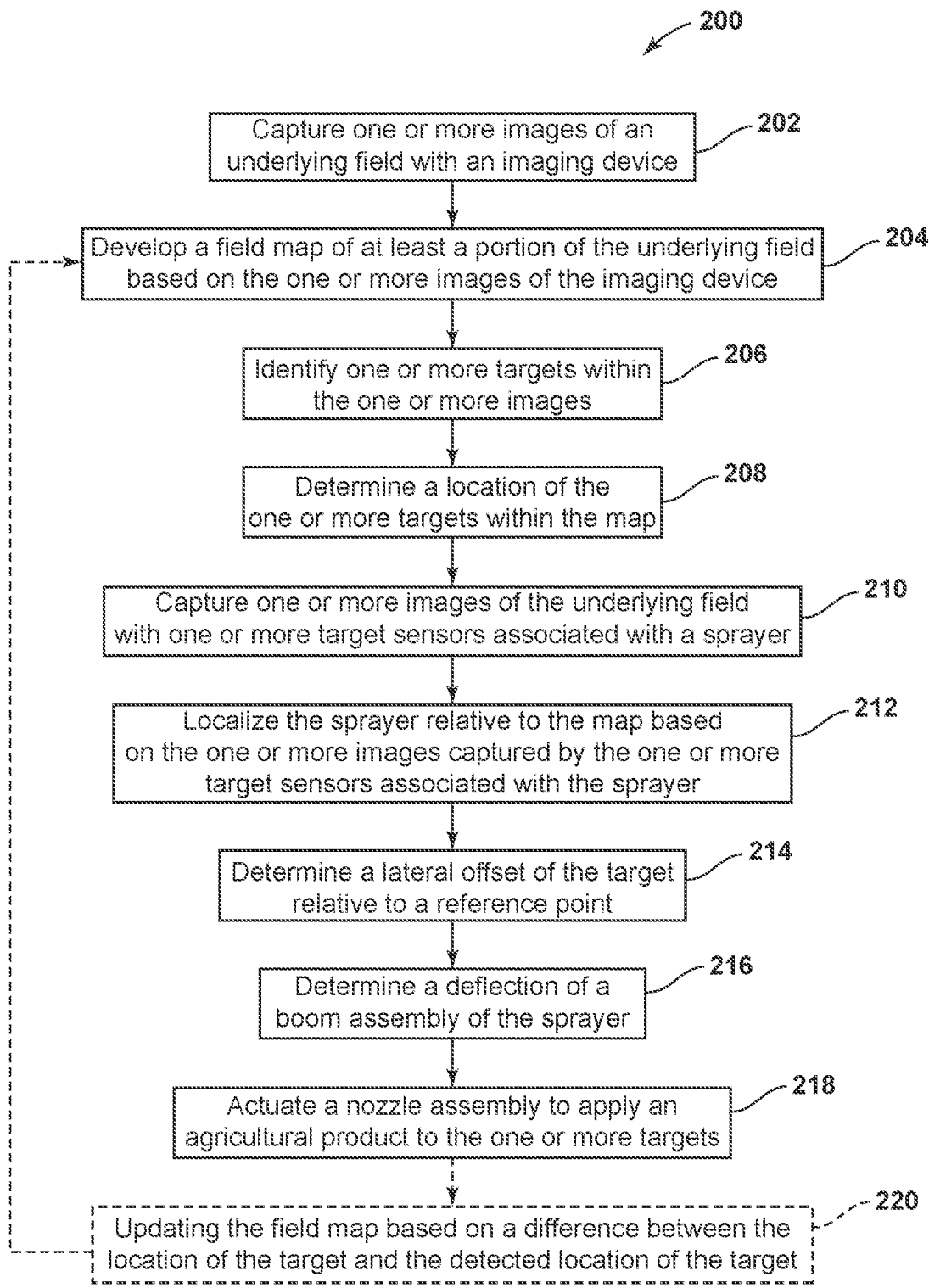
FIG. 10 illustrates a flow diagram of a method of selectively applying an agricultural product in accordance with aspects of the present subject matter.

Referring now to FIG. 10, a flow diagram of some embodiments of a method 200 for selectively applying an agricultural product is illustrated in accordance with aspects of the present subject matter. In general, the method 200 will be described herein with reference to the first vehicle 102, the second vehicle 104, and the system 100 described above with reference to FIGS. 1-9. However, it will be appreciated by those of ordinary skill in the art that the disclosed method 200 may generally be utilized with any suitable agricultural vehicle and/or may be utilized in connection with a system having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (202), the method 200 can include capturing one or more images of an underlying field with one or more imaging sensors associated with a first vehicle. A provided herein, the first vehicle may be configured as one or more UAVs configured to be flown over a field to allow image data to be collected via an imaging sensor supported on the UAV. Specifically, in several embodiments, the UAV may be flown across the field to allow the one or more imaging sensors to collect image data associated with one or more objects within the field and/or a topology for the field. For instance, the UAV may be configured to make one or more passes across the field while the field is in a pre-emergence condition (e.g., prior to the performance of a planting operation within the or following the performance of a planting operation, but prior to the emergence of the plants) to allow the one or more imaging sensors to collect pre-emergence image data associated with the ground surface of the field.

At (204), the method 200 can include developing a field map of at least a portion of the underlying field based on the one or more images with a computing system. In some instances, the map is developed through a SLAM or VSLAM process. However, it will be appreciated that the map may be developed through any other automatically generated method and/or through manual creation. As provided herein, the computing system is remote from the first vehicle and the sprayer.

At (206), the method 200 can include identifying one or more targets within the one or more images with the computing system. In various embodiments, the targets may include a detected weed and/or a detected crop. In such instances, a second vehicle may be used to selectively deposit a suitable herbicide towards a detected/identified weed 96 (FIG. 3) and/or a nutrient towards a detected/identified crop 98 (FIG. 3).

At (208), the method 200 can include determining a location of the one or more targets within the map with the computing system. As provided herein, one or more image processing algorithms may be used to determine one or more targets.

At (210), the method 200 can include capturing one or more images of the underlying field with one or more target sensors associated with the sprayer. At (212), the method 200 can include localizing the sprayer relative to the map based on the one or more images captured by the one or more target sensors associated with the sprayer with the computing system.

At (214), the method 200 can include determining a lateral offset of the target relative to a reference point with the computing system of the sprayer. As provided herein, one or more nozzle assemblies may be positioned along a boom assembly that extends in a lateral direction. Based on the lateral offset of the target relative to a reference point, a defined nozzle may be actuated to apply an agricultural product to the target.

At (216), the method 200 can include determining a deflection of a boom assembly of the sprayer with the computing system of the sprayer. During operation, various forces may be placed on the boom assembly causing the boom arms and, consequently, the nozzle assemblies positioned along the boom arms, to be deflected or repositioned relative to the frame and/or the sprayer. For instance, a portion of the boom assembly may be deflected from an assumed or a default position due to dynamic forces encountered when the sprayer is turned, accelerated, or decelerated. In addition, terrain variations and weather variances may also cause deflection of the boom assembly. Further, a portion of the boom assembly may come in contact with an object, thereby leading to deflection of the boom assembly.

At (218), the method 200 can include actuating a nozzle assembly to apply an agricultural product to the one or more targets when the one or more targets are positioned within an application region of the nozzle assembly based on the position of the sprayer, the lateral offset of the object from the reference point, and the deflection of the boom assembly.

At (220), the method 200 can include updating the field map based on a difference between the location of the target and the detected location of the target. The updating of the field may include updating any of the mapping algorithms utilized by the computing system.

In various examples, the method 200 may implement machine learning methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural operation, the system comprising:
    a first vehicle equipped with an imaging sensor configured to capture image data associated within a field;
    a second vehicle including a boom assembly having first and second nozzle assemblies configured to exhaust an agricultural product;
    a target sensor associated with the second vehicle, the target sensor configured to capture data of an underlying field, and
    a computing system communicatively coupled with the imaging sensor and the target sensor, the computing system configured to:
        receive the image data associated with the field;
        identify one or more objects within the image data as a target, the target being a detected weed;
        identify one or more objects within the image data as a landmark;
        determine a location of the target relative to the landmark;
        predict a deflection of the boom assembly of the second vehicle relative to a lateral direction based on a topology of the field at a position of the target; and
        actuate one of the first nozzle assembly or the second nozzle assembly of the second vehicle when an application region of the first nozzle assembly or an application region of the first nozzle assembly is aligned with the target based on a comparison of the image data from the imaging sensor associated with the first vehicle to image data from the target sensor associated with the second vehicle.

2. The system of claim 1, wherein the first vehicle is configured as an unmanned aerial vehicle (UAV).

3. The system of claim 1, wherein the computing system is further configured to:
    utilize a simultaneous localization and mapping technique to construct and update a field map of the field.

4. The system of claim 3, wherein the second vehicle includes a target sensor configured to capture image data, and wherein the image data from the target sensor is compared to the field map to locate the second vehicle within the field.

5. The system of claim 4, wherein a location of the target is determined relative to the second vehicle within the field.

6. A method for selectively applying an agricultural product, the method comprising:
    capturing, with one or more imaging sensors associated with a first vehicle, one or more images of an underlying field;
    developing, with a computing system, a map of at least a portion of the underlying field based on the one or more images;
    identifying, with the computing system, one or more targets within the one or more images, the one or more objects being detected weeds;
    determining, with the computing system, a location of the one or more targets within the map;
    determining, with the computing system, a topology of the field based on the image data;
    predicting, with the computing system, a deflection of a boom assembly of the second vehicle based on the topology of the field at a position of the target;
    determining, based on data provided by a target sensor operably coupled with the second vehicle, a lateral offset of the target relative to a reference point on the second vehicle; and
    determining, with the computing system of the sprayer, a deflection of a boom assembly of the sprayer; and
    actuating a nozzle assembly to apply an agricultural product to the one or more targets when the one or more targets is positioned within an application region of the nozzle assembly based on the position of the sprayer, the lateral offset of the target from the reference point, and the deflection of the boom assembly.

7. The method of claim 6, further comprising:
capturing one or more images, with one or more target sensors associated with the sprayer, of the underlying field; and
localizing, with the computing system, the sprayer relative to the map based on the one or more images captured by the one or more target sensors associated with the sprayer.

8. The method of claim 7, wherein the computing system is remote from the first vehicle and the sprayer.

9. The method of claim 7, further comprising:
updating, with the computing system, the field map based on a difference between the location of the target and a detected location of the target.

10. The method of claim 6, wherein the map is developed through a SLAM or ISLAM process.

11. A system for an agricultural operation, the system comprising:
a first vehicle equipped with an imaging sensor configured to capture image data associated within a field;
a second vehicle including a boom assembly having one or more nozzle assemblies configured to exhaust an agricultural product;
a target sensor associated with the second vehicle, the target sensor configured to capture data of an underlying field; and
a computing system communicatively coupled with the imaging sensor and the second vehicle, the computing system configured to:
determine a location of an object within the image data provided by the imaging sensor relative to a landmark identified within the image data provided by the imaging sensor, the object being a target in the form of a detected crop in a defined position;
predict a deflection of a boom assembly of the second vehicle relative to a lateral direction based on a topology of the field at the position of the target; and
actuate a nozzle assembly of the second vehicle when an application region of the nozzle assembly is aligned with the object based at least partially on the deflection of the boom assembly.

12. The system of claim 11, wherein the object is a target for which the agricultural product is to be applied thereto, and wherein the control command includes a direction of the target relative to the landmark within the field.

13. The system of claim 12, wherein alignment of the nozzle assembly with the object is based on a comparison of the image data from the imaging sensor associated with the first vehicle to image data from the target sensor associated with the second vehicle.

14. The system of claim 11, wherein the control command includes an application map that is generated based on image data captured from one or more imaging sensors through a SLAM or VSLAM process.

15. The system of claim 11, wherein the computing system is remote from the first vehicle and the second vehicle.

* * * * *